United States Patent
Ouchi et al.

(10) Patent No.: US 6,368,223 B1
(45) Date of Patent: Apr. 9, 2002

(54) ROLLING BEARING UNIT AND CONSTANT VELOCITY JOINT FOR WHEELS

(75) Inventors: Hideo Ouchi; Shigeoki Kayama, both of Fujisawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/116,527

(22) Filed: Jul. 16, 1998

(30) Foreign Application Priority Data

| Jul. 16, 1997 | (JP) | 9-191433 |
| Dec. 5, 1997 | (JP) | 9-335500 |
| Jun. 26, 1998 | (JP) | 10-180667 |
| Jun. 26, 1998 | (JP) | 10-180668 |

(51) Int. Cl.[7] ................................. F16D 3/224
(52) U.S. Cl. ........................ 464/145; 384/497
(58) Field of Search ................. 464/145, 167, 464/906; 384/497

(56) References Cited

U.S. PATENT DOCUMENTS

| 1,660,775 A | * | 2/1928 | Webb | 464/143 |
| 3,324,682 A | | 6/1967 | Bendler | |
| 3,412,580 A | * | 11/1968 | Cull | 464/145 |
| 4,129,345 A | | 12/1978 | Krude | |
| 4,372,628 A | | 2/1983 | Kiener et al. | 308/187.1 |
| 4,405,032 A | | 9/1983 | Welscof et al. | 180/259 |

(List continued on next page.)

FOREIGN PATENT DOCUMENTS

| DE | 42 34 488 | 3/1994 |
| EP | 0 802 341 | 10/1997 |
| FR | 2 655 103 | 5/1991 |
| GB | 1072475 | 6/1967 |
| GB | 1 416 989 | 12/1975 |
| GB | 2 088 526 | 6/1982 |
| GB | 2 127 132 | 4/1984 |
| GB | 2 109 874 | 6/1993 |
| JP | 57-145824 | 9/1982 |
| JP | 57-145825 | 9/1982 |
| JP | 57-151102 | 9/1982 |
| JP | 59-185425 | 12/1984 |
| JP | 62-12021 | 1/1987 |
| JP | 7-317754 | 12/1995 |
| JP | 9-177814 | 7/1997 |
| WO | WO 97/24538 | 7/1997 |

OTHER PUBLICATIONS

Green et al, Machinery's Handbook, 25th ed., Industrial Press, New York, pp. 2056 & 2057, 1996.*
"Ball and Roller Bearing Engineering", AG Bearings Corporation, 1983 (catalogue).
"Constant Velocity Universal Joints for Automobiles", New Technology Network (catalogue), Oct. 6, 1999.

*Primary Examiner*—Lynne H. Browne
*Assistant Examiner*—Greg Binda
(74) *Attorney, Agent, or Firm*—Crowell & Moring LLP

(57) ABSTRACT

A combination of a rolling-bearing unit for wheels and a constant velocity joint, the rolling-bearing unit comprising a stationary outer ring assembly with a fist installation flange for suspension and outer-ring raceways, and a rotatable inner ring assembly with a second installation flange for supporting a vehicle wheel and inner-ring raceways, and a housing portion serving as the outer ring of the constant velocity joint, rolling members between the outer-ring raceways and inner-ring raceways, and the constant velocity joint comprising an inner ring attached to the end of the drive shaft, inner and outer engagement grooves having an arc-shaped cross section perpendicular to the circumferential direction of the outer and inner peripheral surfaces of the housing portion such that the outer engagement grooves face the inner engagement grooves, respectively, a cage formed with longer and shorter pockets in the positions in alignment with the inner and outer engagement grooves, and eight balls held inside the pockets to rotate freely along the inner and outer engagement grooves.

1 Claim, 18 Drawing Sheets

U.S. PATENT DOCUMENTS

| | | |
|---|---|---|
| 4,417,643 A | 11/1983 | Guimbretierè ............. 180/254 |
| 4,424,047 A | 1/1984 | Welschof et al. ........... 464/145 |
| 4,449,841 A | 5/1984 | Brandenstein et al. |
| 4,466,503 A | 8/1984 | Hans et al. |
| 4,494,941 A * | 1/1985 | Hirai et al. ................. 464/145 |
| 4,497,495 A | 2/1985 | Christiansen |
| 4,589,857 A | 5/1986 | Okoshi |
| 4,621,700 A * | 11/1986 | Merkelbach ............ 464/906 X |
| 4,668,111 A * | 5/1987 | Kapaan .................. 464/906 X |
| 5,221,233 A | 6/1993 | Jacob |
| 5,222,914 A * | 6/1993 | Mazziotti ................ 464/145 X |
| 5,509,856 A | 4/1996 | Welschof |
| 5,782,696 A * | 7/1998 | Guimbretiere .............. 464/145 |
| 5,975,767 A * | 11/1999 | Mizukoshi et al. ..... 464/145 X |
| 6,120,382 A * | 9/2000 | Sone et al. ................. 464/145 |

\* cited by examiner

ROLLING BEARING UNIT AND CONSTANT VELOCITY JOINT FOR WHEELS

FIELD OF THE INVENTION

The present invention relates to a rolling bearing unit and constant velocity joint for wheels, specifically a rolling bearing unit and constant velocity joint for rotatably supporting a front wheel of the automobile of the front engine front wheel drive (FF) type or four wheel drive (4WD) with respect to the suspension.

BACKGROUND OF THE INVENTION

In order to rotatably support a vehicle wheel or road wheel with respect to the suspension, various kinds of rolling-bearing units for wheels have been used wherein outer and inner races or rings can rotate freely by way of rolling members. Here, when a rolling-bearing unit for supporting the front wheel of the FF automobile or 4WD automobile, which is the driven wheel as well as the steering wheel, is combined with a constant velocity joint, it is necessary that rotation of the drive shaft be transmitted smoothly (maintaining uniform speed) to the vehicle wheel regardless of the steering angle applied to the vehicle wheel.

Also, when a rolling-bearing unit for supporting the driven wheel of the automobile with the independent type suspension is combined with a constant velocity joint, it is necessary that rotation of the drive shaft be transmitted smoothly (maintaining uniform speed) to the vehicle wheel regardless of the relative displacement between the differential gear and the driven wheel and of the steering angle applied to the vehicle wheel.

WO 97/24538 disclosed an eight ball constant velocity joint wherein (1) the ratio of the pitch circle diameter of the torque transmitting balls to the diameter of the torque transmitting balls is between 3.3 to 5.0, and (2) the ratio of the outer diameter of the outer joint member to the pitch circle diameter of the tooth profile of the inner joint member is set within the range from 2.5 to 3.5.

However, U.S. Pat. No. 5,221,233 had disclosed prior to WO 97/24538 an eight ball constant velocity joint, wherein determining the dimension relation of (1) and (2) above is an inherent setting matter under the limited conditions, which can be practically set by a person skilled in the art in the most optimum values taking into consideration the strength of the outer joint member, the strength of the inner joint member, and the strength of the cage.

In addition, in the eight ball constant velocity joint of WO 97/24538, (3) the cage has short and long pockets, the short pockets being arranged with a space of 180 degrees between them.

However, U.S. Pat. No. 5,509,856 (filed on Oct. 13, 1993, its German counterpart is published on Mar. 24, 1994) disclosed a technology of the six ball constant velocity joint where the width of the posts (webs or column sections) of the cage is sufficiently kept while being capable of incorporating the balls in it.

Specifically, since the balls already incorporated move circumferentially in the cage pockets when the cage is tilted to incorporate the remained balls, the pockets must be longer by that amount.

However, the last two balls for incorporation to be spaced apart from each other with a space of 180 degrees is not required to move circumferentially, so that the pockets spaced apart 180 degrees for the last two balls can be shorter. Therefore, the width of the posts (webs or column sections) of the cage can be wider to improve the cage strength.

On the other hand, U.S. Pat. No. 5,221,233 discloses a technology to make the number of balls eight to increase the load capacity. Upon combining these technologies, the former technology to make the incorporation convenient has no relation with the latter technology to increase the load capacity. Accordingly, there is no relation between the arrangement of shorter pockets spaced apart 180 degrees and the increase of balls from six to eight, and there is no special technical meaning in combining such technologies.

A relatively compact and lightweight rolling-bearing unit for wheels used with this kind of constant velocity joint has been disclosed in Japanese Patent Publication TokuKai-Hei No.7-317754.

FIG. 1 shows the construction of the bearing described in this disclosure. When installed in the vehicle or automobile, the outer race or ring 11, which does not rotate when supported by the suspension, has a first installation flange 12 for supporting it to the suspension around its outer peripheral surface and a double row of outer-nag raceways 13 around its inner peripheral surface. Disposed on the inside of the outer race or ring 11 is a hub 16 which comprises a first inner race or ring 14 and a second inner ring 15.

The first inner ring 14 has a second installation flange 17 for supporting the vehicle wheel on one end portion (left end portion in FIG. 1) and a first inner ring raceway 18 on the other end portion (right end portion in FIG. 1), both of which are cylindrical shaped.

The second inner ring 15 has a cylindrical section 19 on one end portion (left end in FIG. 1) for fitting the first inner ring 14 thereon, a housing portion 52, which is the outer member or ring of the constant velocity joint 1 (detailed later), on the other end portion (right end in FIG. 1), and a second inner ring raceway 20 around the outer peripheral surface in the middle portion. By placing several rolling members 21 between the outer-ring raceways 13 and the first and second inner-ring raceways 18, 20, respectively, the hub 5 can rotate freely inside the outer ring 11.

Moreover, a first attachment groove 22 is formed in the inner peripheral surface of the first inner ring 14 and a second attachment grooves 23 is formed in the outer peripheral surface of the second inner ring 15, where the first and second attachment grooves 22, 23 come together in alignment, and by placing a retaining ring 24 in both of these attachment grooves 22, 23, the first inner ring 14 is prevented from coming out of the second inner ring 15.

Furthermore, the outer peripheral edge of one end face (left end face in FIG. 1) of the second inner ring 15 is joined to the inner peripheral edge of a stepped section 25 formed around the inner peripheral surface of the first inner ring 14 by a weld 26, such that the first ring 14 and second inner ring 15 are joined together.

Also, a substantially cylindrical shaped cover 27a and a circular ring shaped seal ring 28a are located between the opening portion at one end of the outer ring 11 and the corresponding outer peripheral surface portion in the middle portion of the hub 16 while a substantially cylindrical shaped cover 27b and a circular ring shaped seal ring 28b are located between the opening portion on the other end of the outer a ring 11 and the corresponding outer peripheral surface portion in the middle portion of the hub 16. The substantially cylindrical shaped covers 27a, 27b are made of metal such as stainless steel, and the circular ring shaped seal rings 28a, 28b are made of elastic material such as rubber or elastomer.

These covers 27a, 27b and seals 28a, 28b seal of the area where the rolling members 21 are located from the outside, which prevents the grease in this area from leaking out, and also rain water, dirt or other foreign matter from getting into this area.

Moreover, there is a partition plate 29 inside of the middle portion of the second inner ring 15 to close off the inside of the second inner ring 15, which maintains the rigidity of the second inner ring 15, and prevents foreign matter that has gotten into the inside of the second inner ring 15 through the opening on the one end (left end in FIG. 1) from reaching the constant velocity joint 1 located on the inside of the housing portion 52.

The constant velocity joint 1 comprises an inner member or ring 2, retainer or cage 9 and multiple balls (engagement balls) 4 in addition to the housing portion 52. Of these components, the inner ring 2 is attached to the end of the drive shaft (not shown in the figures) which is driven and rotated by the engine by way of the transmission.

There are six inner engagement grooves 7 having an arc-shaped cross-section which are formed on the outer peripheral surface of the inner ring 2 such that they are separated at equal intervals in the circumferential direction and are perpendicular to the circumferential direction.

Moreover, there are six outer engagement grooves 8 having an arc-shaped cross-section which are formed on the inner peripheral surface of the housing 52, such that they are perpendicular to the circumferential direction. The outer engagement grooves 8 face the inner engagement grooves 7 for engagement, respectively.

The retainer 9 has an arc-shaped cross section and is entirely circular ring shaped and is placed between the outer peripheral surface of the inner ring 2 and the inner peripheral surface of the housing portion 52. At six places around the circumference of his retainer 9, pockets 10 are located at the position in alignment with the inner engagement grooves 7 and outer engagement grooves 8, and there is one ball 4 held inside each one of these pockets for a total of six balls 4. With each ball 4 held in a pocket 10, they can rotate freely along the inner engagement grooves 7 and outer engagement grooves 8.

When installing the rolling-bearing unit for wheels, that is constructed as described above, into a vehicle, the outer ring 11 is supported by the suspension through the first installation flange 12, and the vehicle wheel, which is a driven wheel or front wheel in this case is fastened to the first inner ring 14 by the second installation flange 17.

Also, the tip end portion of the drive shaft (not shown in the figures) which is rotated and driven by the engine by way of the transmission, fits inside the inner ring 2 of the constant velocity joint 1 by a spline engagement. When the vehicle is moving, the rotation of the inner ring 2 is transmitted by way of the multiple balls 4 to the hub 16 which includes the second inner ring 15, thereby rotating and driving the driven wheel or front wheel.

In the case of the conventional rolling-bearing unit for wheels as shown in FIG. 1, it is very difficult to made the unit more compact and lightweight. The reasons for this are as follows. The number of the inner engagement grooves 7, outer engagement grooves 8 and balls 4 located inside the constant velocity joint 1 which is built into the rolling-bearing unit described above is normally six for each.

Therefore, in the case of this kind of rolling-bearing unit with constant velocity joint 1 integrally built in, it is necessary to increase somewhat the outer diameter of the balls 4 of the constant velocity joint 1 in order that the required torque may be transmitted while maintaining the rolling fatigue life of the interfacing groves 7, 8 and the rolling surfaces of balls 4 in the constant velocity joint 1.

Accordingly, in the case of this conventional rolling-bearing unit for wheels, the diameter of the circumscribed circle of the outer engagement grooves 8, that is determined by the size of the diameter of the circumscribed circle of the balls 4, is larger than the diameter of the second inner ring raceway 20 around the outer peripheral surface of the second inner ring 15, which is one of the inner-ring raceways 18, 20 that are formed in rows around the outer peripheral surface in the middle portion of the hub 16.

Therefore, this conventional rolling-bearing unit for wheels comprises a rolling-bearing portion and a constant velocity joint portion which are lined up in series with each other in the axial direction as shown in FIG. 1, wherein the rolling-bearing portion is made up of the outer ring 11 with the outer-ring raceways 13 foamed in rows around the inner peripheral surface of the outer ring 11, the middle portion of the hub 16 with the first and second inner ring raceways 18, 20 formed around the outer peripheral surface in the middle portion of the hub 16, and the multiple rolling members 21 that are located between the first and second inner-ring raceways 18, 19 and the outer-ring raceways 13.

With the rolling-bearing portion and constant velocity joint portion arranged in series, the dimensions in the axial direction of the entire rolling-bearing unit for wheels become large, which also causes the weight to increase. The increased weight of the rolling-bearing unit would cause a larger unspringing load on the vehicle, and therefore it is desired that the rolling-bearing unit be made more compact and light weight.

It is possible to overlap the second inner-ring raceway 20 and part of the outer engagement grooves 8 in the radial direction by making the diameter of the second inner-ring raceway 20 larger than the diameter of the circumscribed circle of each outer engagement groove 8, so that the dimensions in the axial direction of the rolling-bearing unit for wheels is reduced.

However, if the diameter of the second inner-ring raceway 20 is simply enlarged, instead of being able to reduce the dimensions in the axial direction of the rolling-bearing unit for wheels, the dimensions in the radial direction become larger, causing the weight of the entire unit to increase by that amount, and thus making it impossible to achieve the more compact and light weight rolling-bearing unit.

A constant velocity joint is located between the automobile transmission and the drive wheels which are supported by an independent suspended-type suspension and regardless of the relative displacement between the differential gear and the drive wheel, or the steering angle applied to the drive wheels, the drive force from the engine is freely transmitted to the drive wheels with the same angular velocity all the way around.

The constant velocity joint used in this area has been disclosed previously, for example in Japanese Utility Model Publication JITSUKAI Nos. Sho 57-145824~5, Sho 59-185425, and Sho 62-120-21.

This prior constant velocity joint 1, as shown in FIGS. 2 thru 4, transmits a rotating force by way of six balls 4 located between an inner member or ring 2 and outer member or ring 3. The inner ring 2 is fixed to the outer end of a shaft 5, which is rotated and driven by the transmission.

Therefore, the inner ring 2 is formed at its center portion a spline hole 51 for engagement with a male spline portion provided on the end portion of the shaft 5.

Also, the outer ring 3 is fixed to the inner end of another shaft 6 which connects to the drive wheels. Six inner engagement grooves 7 arc-shaped in cross section are formed around the outer peripheral surface 2a of the inner ring 2, and are formed so that they are equally spaced in the circumferential direction and so that they are orthogonal to the circumferential direction. Moreover, six outer engagement grooves 8 arc-shaped in cross section are formed around the inner peripheral surface 3a of the outer ring 3, and are such that they face the inner engagement grooves 7 and are orthogonal to the circumferential direction.

Furthermore, a generally ring-shaped retainer 9 with arch-shaped cross section is fitted between the outer peripheral surface 2a of the inner ring 2 and the inner peripheral surface 3a of the outer ring 3. Six pockets 10 are formed at six locations in the circumferential direction around this retainer 9 such that they match the locations of the inner and outer engagement grooves 7, 8, and a ball (engagement ball) 4 is held inside each of these pockets 10 for a total of six balls 4. These balls 4 are held inside the pockets 10, so that they can freely roll along the inner and outer engagement grooves 7, 8.

The pockets 10, as shown in FIG. 3, are rectangular in the circumferential direction, and as the crossing angle $\alpha$ of the shaft, to be described later, changes, the space between balls 4 adjacent to each other in the circumferential direction can absorb this change in other words, the relationship between the bottom surfaces 7a of a pair of inner engagement grooves 7, and the relationship between the bottom surfaces 8a of a pair of outer engagement grooves 8, as shown by the dashed line in FIG. 5, is as the lines of longitude around the globe.

When the center axis of the inner ring 2 matches the center axis of the outer ring 3 (shaft crossing angle $\alpha$=180 degrees), the balls 4 are located, as shown by the double dashed line in FIG. 5, near what would correspond to the equator of the globe.

On the other hand, when the center axis of the inner ring 2 does not match the center axis of the outer ring 3 (shaft crossing angle $\alpha$<180 deg.), as the constant velocity joint 1 makes one turn, the balls 4 make one cycle in the up and down direction shown in FIG. 5 (move alternately in the direction of the north pole and south pole of the globe) As a result, the space between a pair of balls 4 which are adjacent to each other in the circumferential direction is enlarged and shrunk, therefore the pockets 10 are rectangular shaped in the circumferential direction so that the spacing between the adjacent balls 4 can be enlarged and shrunk.

The bottom surfaces 7a of the inner engagement grooves 7 and the bottom surfaces 8a of the outer engagement grooves 8, are not concentric, as will be made evident in the aforementioned explanation. Moreover, The lines which correspond to longitudes are shifted a little for each set of engagement grooves 7, 8.

Furthermore, as shown in FIG. 2, regardless of the displacement of the one shaft 5 and the other shaft 6, the balls 4 are located in an equally divided surface Z, that is made by equally dividing the shaft crossing angle $\alpha$ of the shafts 5, 6, or in other words that is made by dividing the angle $\alpha$ that is formed by the center axis X of the one shaft 5 and center axis Y of the other shaft 6 which cross at point O. Therefore, the bottom surface 7a of inner engagement groove 7 is located above center axis X on the spherical surface whose center is point D that is separated a distance H from the intersection O, and the bottom 8a of outer engagement groove 8 is located above center axis Y on a spherical surface whose center is point E that is separated a distance H from the intersection O. However, the outer peripheral surface 2a of the inner ring 2, the inner peripheral surface 3a of the outer ring 3, and the inner and outer peripheral surfaces of the retainer or cage 9 are located on a spherical surface whose center is the intersection O, and sliding movement of the outer peripheral surface 2a of the inner ring 2 and the inner peripheral surface of the retainer 9, and the sliding movement of the inner peripheral surface 3a of the outer ring 3 and the outer peripheral surface of the retainer 9 is free.

In the case of the constant velocity joint 1 which is constructed as described above, when the inner ring 2 is rotated by the shaft 5, this rotation is transmitted to the outer ring 3 by way of the six balls 4, and rotates the shaft 6. If the positional relationship (shaft crossing angle $\alpha$) of the shafts 5, 6 changes, the balls 4 rotate along the inner and outer engagement grooves 7, 8 to allow for the displacement of the one shaft 5 and the other shaft 6.

The basic construction and action of the constant velocity joint was described above, however, recently combining this kind of constant velocity joint with a roller-bearing unit for wheels, where the wheel is rotatably supported by a suspension, is being studied. In other words, in order for the suspension to rotatably support a vehicle or road wheel, a rolling-bearing unit for wheels which rotates freely outer ring and inner ring through rolling members is used. By integrating this kid of rolling-bearing unit for wheels and the constant velocity joint, described above, it is possible to make the rolling-bearing unit for wheels and constant velocity joint more compact and light weight. This kind of integrated rolling-bearing unit for wheels and constant velocity joint is called a fourth-generation hub unit and has been previously disclosed in Japanese Patent Publication KOKAI No. Hei 7-317754 as previously mentioned on FIG. 1.

Explanation is repeated hereinafter. FIG. 1 shows the construction of this previously disclosed rolling-bearing unit. With the unit installed in an automobile, the outer ring 11 is supported by the suspension and does not rotate, and comprises an outer peripheral surface formed with a first installation flange 12 which is supported by the suspension, and an inner peripheral surface formed with multiple outer-ring raceway 13. There is a hub 16 located on the inside of the outer ring 11 which comprises first and second inner-ring members 14, 15.

Of these, the first inner-ring member 14 is cylindrical shaped and has a second installation flange 17 for supporting the road wheel located on the outer peripheral surface on one end side (left end side in FIG. 1), and a first inner-ring raceway 18 located on the other end side (right end side in FIG. 1).

On the other hand, the second inner-ring member 15 has a cylindrical section 19 on one end portion (left end portion in FIG. 1) which fits over and attaches to the first inner-ring member 14, and on the other end portion (right end portion in FIG. 1) there is a second inner-ring raceway 20 located around the outer peripheral surface in the middle and serves as the outer ring 3 of the constant velocity joint 1. Also, by placing several rotating members 21 between the outer-ring raceways 13 and the first and second inner-ring raceways 18, 20, it is possible for the hub 16 to rotate freely inside of the outer ring 11.

In the locations in alignment on where the inner peripheral surface of the first inner-ring member 14 meets and the outer peripheral surface of the second inner-ring member 15, there are attachment grooves 22, and by placing a attachment ring 24 over these attachment grooves 22, the first inner-ring member 14 is prevented from coming out of the second inner-ring member 15. Furthermore, the first and second inner-ring members 14, 15 are connected together by a weld 26 between the outer peripheral edge on one end face (left end face in FIG. 1) of the second inner-ring member 15, and the inner peripheral edge on a stepped section 25 that is formed around the inner peripheral surface of the first inner-ring member 14.

Furthermore, substantially cylindrical shaped covers 27a, 27b, made of metal such as stainless steel, and ring-shaped seal rings 28a, 28b, made of rubber or elastomer, are located between the openings on both ends of the outer ring 1 and the outer peripheral surface in the middle portion of the hub 16. These covers 27a, 27b, and seal rings 28a, 28b, cut off from the outside the area where the rolling members 21 are located, so as to prevent the grease in this area from leaking out and to prevent rain water or other matter such as dust from getting in. Moreover, a dividing plate 29 is located on the inside in the middle portion of the second inner-ring member 15 so that it covers the inside of this second inner-ring member 15, so as to securely maintain the rigidity of the second inner-ring member 15, and to prevent objects, which have gotten into the inside of this second inner-ring member 15 from the opening on the end (left end in FIG. 1) of this second inner-ring member 15, from getting into the area of the constant velocity joint 1a.

When installing the rolling-bearing unit for wheels, which is constructed as described above, into an automobile or vehicle; the outer ring 11 is supported by the suspension by the first installation flange 12, and the vehicle wheel, which is the driven wheel, is attached to the first inner-ring member 14 by the second installation flange 17. Also, the tip end portion of the drive shaft, which is not shown in the figures and which is rotated and driven by the engine by way of the transmission, is connected to the inside of the inner ring 2 of the constant velocity joint 1 with splines. As the automobile moves, the rotation of this inner ring 2 is transmitted to the hub 16, which includes the second inner-ring member 15, by way of the several balls 4, and thus rotates and drives the road wheel.

In order to make the fourth-generation hub unit described above even more compact, it is effective to reduce the diameter of the circumscribed circle of the balls 4 of the constant velocity joint 1. Also, in order to decrease the diameter of this circumscribed circle, it is necessary to decrease the diameter of the balls 4, and in order to maintain the torque that can be transmitted by the constant velocity joint 1, it is necessary to increase the number of balls 4. Moreover, even if the number of balls 4 is increased due to these circumstances, in order to maintain the durability of the retainer or cage 9 which holds these balls 4, it is necessary to maintain the dimension in the circumferential direction of the column sections 30 (see FIGS. 2, 3, 6 and 9) which are located between pairs of pockets 10 in the retainer 9. This is because, if the length in the circumferential direction of these column sections 30 is insufficient, the strength of the retainer 9 will not be enough, and when used over a long period of time, damage such as cracking around the edges of the pockets 10 could occur. However, increasing the length of the column sections 30 is limited by the fact that interference to the balls 4 must be prevented.

In other words first, if the length in the circumferential direction of the pockets 10 must be large enough such that it is possible for the balls 4 to be displaced in the circumferential direction of the retainer 9 when rotated at the joint angle of the constant velocity joint 1 (angle when the positional relationship of the center axis of inner ring 2 and center axis of outer ring 3 shifts from the straight line state; supplementary angle of the shaft crossing angle α shown in FIG. 1). Second, the length must be large enough, so that the balls 4 can be installed in the pockets 10 of the retainer 9 after the inner ring 2, outer ring 3 and retainer 9 of the constant velocity joint 1 have been assembled.

In considering these points, a constant velocity joint 1 which uses more than six balls 4 and a column section whose length in the circumferential direction has been enlarged has been disclosed in Japanese Publication TOKUKAI No. Hei 9-177814, and is shown in FIGS. 6 thru 9. The constant velocity joint 1 of this disclosure is constructed so as to transmit rotational power between the inner ring 2 and outer ring 3 by way of eight balls 4. Also, in the construction of this disclosure, at eight places in the circumferential direction around the retainer 9 there are pockets 10a which are long in the circumferential direction and pockets 10b which are short in the circumferential direction, and they are alternately located such that they are evenly spaced (separating pitch angle is the same). Of these two kinds of pockets 10a, 10b, the short pockets 10b are large enough that neither edge in the direction of length of the pockets 10b interfere with the rolling surface of the balls 4 that are held inside the pockets 10b, even when the constant velocity joint 1 is used with a maximum joint angle. On the other hand, the long pockets 10a are large enough that neither edges of the pockets 10a in the direction of length interfere with the balls 4 installed already in the pockets 10a, even when the center axis of the inner ring 2 and the center axis of the outer ring 3 are inclined such that they exceed the maximum operating joint angle in order that the balls 4 are assembled in the pockets 10b.

With the constant velocity joint disclosed in Japanese Publication TOKUKAI No. Hei 9-177814 and constructed as described above, by placing the balls 4 in the short pockets 10b after placing the balls 4 in the long pockets 10a, the balls 4 can be placed inside all of the pockets 10a, 10b. In other words, when placing the balls 4 inside these pockets 10a, 10b, the center axis of the inner ring 2 and the center axis of the outer ring 3 are inclined so as to exceed the maximum operating joint angle as shown in FIG. 9. When placing the balls 4 into the long pockets 10a, the edges of these pockets 10a and the edges of the inner engagement grooves 7 formed around the outer peripheral surface of the inner ring 2 match for one ball 4 or more. Therefore, the balls 4 can be properly placed inside these pockets 10a. Next, by tilting the center axis of the inner ring 2 and the center axis of the outer ring 3 as shown in FIG. 9, so that the balls 4 are placed in the short pockets 10b, the balls 4 already placed in the long pockets 10a, move inside the pockets 10a in the direction toward the short pockets 10b as shown by the dashed arrow in FIG. 8. Also, the centers of the short pockets 10b match the inner engagement grooves 7 formed around he outer peripheral surface of the inner ring 2 in alignment. Therefore, the balls 4 can be properly placed inside these pockets 10b.

The state with the balls 4 placed inside the pockets 10a, 10b will be explained using FIG. 10. FIG. 10 diagrammatically shows the locations of the pockets 10a, 10b in the retainer 9 of the constant velocity joint and their respective lengths. There are four pockets of each kind 10a, 10b for a total of eight, and they are arranged so that they are equally spaced every 45 degrees (π/4 radian) around the circumference. The arc-shaped sections that are indicated with code numbers 1 thru 8 together with being shaded, show the positions and lengths of each of the pockets 10a, 10b. In other words, the center in the circumferential direction of each of these arc-shaped sections corresponds to the center in the direction of length of the pockets 10a, 10b. Moreover, the lengths of these arc-shaped sections indicate the amount that the balls 4 in the pockets 10a, 10b (see FIGS. 6 thru 9) move in the circumferential direction, corresponding to the lengths of the pockets 10a, 10b. In other words, the balls 4 that are placed in the long pockets 10a freely move a distance $\gamma_0$ in the circumferential direction on either side of the center position. On the other hand, the balls 4 that are placed in the short pockets freely move a distance $\gamma_1$ in the circumferential direction on either side of the center position. These angles $\gamma_0$ and $\gamma_1$, that are shown in FIG. 10 and also in FIG. 22 to be described later, have been exaggerated for the purpose of clarity. Moreover, the work of placing the balls 4 in different arc-shaped sections which are concentrically placed and indicated with the code numbers ① thru ⑧, is performed in order in the radial direction from the inside out Placing the balls 4 in the same arc-shaped sections is not performed at the same time, but which is placed first does not matter.

When placing the balls 4 in the retainer 9 disclosed above, first, balls 4 are place in order one at a time in the long pockets 10a which are indicated by code numbers ①, ③, ⑤ and ⑦. Next, balls 4 are placed in order one at a time in the four short pockets 10b that are indicated by code numbers ②, ④, ⑥ and ⑧. In order to be able to perform this work, the center axis of the inner ring 2 and the center axis of the outer ring 3 are tilted as shown in FIG. 9, and as is shown by the arrows in FIG., 10, the balls 4 that are already placed in the long pockets 10a move in the direction toward the short pockets 10b. However, since the lengths of these pockets 10a are long, the inner surface of the lengthwise edges of the pockets 10a do not interfere with the rolling surfaces of the balls installed already in the pocket 10a, before the short pockets 10b line up with the inner engagement grooves 7 formed on the outer peripheral surface of the inner ring 2 for one or more balls 4. Therefore, it is possible to greatly tilt the center axis of the inner ring 2 and the center axis of the outer ring 3 and to properly place the balls 4 in the short pockets 10b.

In the case of the constant velocity joint stat is disclosed in Japanese Patent Publication TOKUKAI No. Hei 9-177814, two kinds of pockets 10a, 10b with differing length in the circumferential direction are equally spaced and alternated in the circumferential direction. Therefore, in comparison with a constant velocity joint that uses only one kind of pocket, it is possible to increase the length in the circumferential direction of the column section located between adjacent pockets, however, they still cannot be made sufficiently large.

In other words, in the prior construction as disclosed in the aforementioned disclosure, there are long and short retainer pockets 10a, 10b, however when placing the balls 4 are inside the pockets 10a, 10b, moving (rotating) the retainer 9 the circumferential direction was not considered.

In regards to this, the inventors have considered an invention, wherein when placing a ball in a pocket, another balls already installed in a pocket are arranged to press against the edges of the pockets in the circumferential direction so that the retainer rotates in the circumferential direction, therefore of these two kinds of pockets, long and short, it is possible to shorten the long pockets and increase the length in the circumferential direction of the column sections, thus improving the strength and durability of the retainer.

However, if the length of the two kinds of pockets, short and long are unrestricted, it may not be possible to place the balls inside the pockets or maintain the dimensions of the column sections, thus making it impossible to sufficiently improve the durability of the retainer.

In JP Patent Publication KOKAI No. Hei 9-317783, there is a description on the constant velocity joint with eight torque transmitting balls installed therein, specifically on controlling the relation between the pitch circle diameter $D_P$ of the eight torque transmitting balls and the torque transmitting ball diameter $D_B$, and the relation between the outer diameter $D_O$ of the outer joint member of the constant velocity joint and the pitch circle diameter $D_S$ of the tooth profile (female serration) formed in the inner surface of the inner joint member, more specifically, in the relations of $3.3 \leq D_P/D_B \leq 5.0$ and $2.5 \leq D_O/D_S \leq 3.5$.

However, a compact constant velocity joint keeping the strength and durability can not be achieved only with the control of the relations between the pitch circle diameter $D_P$ and the ball diameter $D_B$ and between the outer diameter $D_O$ and the pitch circle diameter $D_S$. Particularly, the relations between the pitch circle diameter $D_S$ determining the torque capacity of the constant velocity joint, the ball diameter $D_B$ greatly affecting the durability of the constant velocity joint, and the ball pitch circle diameter $D_P$ and the ball diameter $D_B$ must be arranged taking into full consideration the strength of column portions in the retainer or cage.

On the other hand, if the outer diameter of the outer member or ring of the constant velocity joint with six balls installed therein, as conventionally generally constructed, is reduced by 7% by increasing the number of balls to eight, and provided that the ratio of the ball pitch circle diameter $D_P$ to the ball diameter $D_B$ as in JP Publication KOKAI No. Hei 9-317783 is 5.0, the ball diameter $D_B$ would be too small, so that the contact surface pressure between the balls and the inside surfaces of the outer engagement groove and inner engagement groove would be substantially higher comparing with the constant velocity joint with six balls therein, resulting in lower durability. On the contrary, in the case where the ratio of the ball pitch circle diameter $D_P$ to the ball diameter $D_B$ is 3.3, the length of column portions in the cage is small diameter $D_B$ due to the larger ball diameter, so that the strength and durability of the cage is reduced.

In addition, in JP Publication KOKAI No. Hei 9-317783, where the ratio of the outer ring diameter $D_O$ to the pitch circle diameter $D_S$ is in the range of 2.5 to 3.5, the following points must be further taken into consideration;

where the ball pitch circle diameter $D_P$ is set with reference to the inner member or ring and outer member or ring in order to make the constant velocity joint compact, and how the ball diameter $D_B$ is set.

For example, if the ball pitch circle diameter $D_P$ is larger, the thickness of material of the inner member or ring would be larger to increase the strength and durability of the inner member or ring, and the column portions of the cage or retainer would be longer to increase the strength and durability of the cage or retainer. However, the thickness of material of the outer member or ring would be thin to decrease the strength and durability of the outer member or ring.

On the other hand, if the ball pitch circle diameter $D_P$ is smaller, the wall thickness of material of the inner member or ring would be tin to decrease the strength and durability of the inner member or ring, and the column portions of the cage or retainer would be shorter to decrease the strength and durability of the cage or retainer.

SUMMARY OF THE INVENTION

The present invention takes the problems mentioned above into consideration, and provides a compact and durable constant velocity joint which makes it possible to increase the lengths of the column sections, improve the strength of the retainer.

Another object of the present invention is to provide a compact and light weight rolling-bearing unit for a vehicle wheel comprising a rolling bearing portion and a constant velocity portion.

Another object of the present invention is provide a compact constant velocity joint the strength and durability in elements of which are substantially the same to the conventional one with six ball installed therein.

DETAILED DESCRIPTION OF THE EMBODIMENTS

Figure 1:
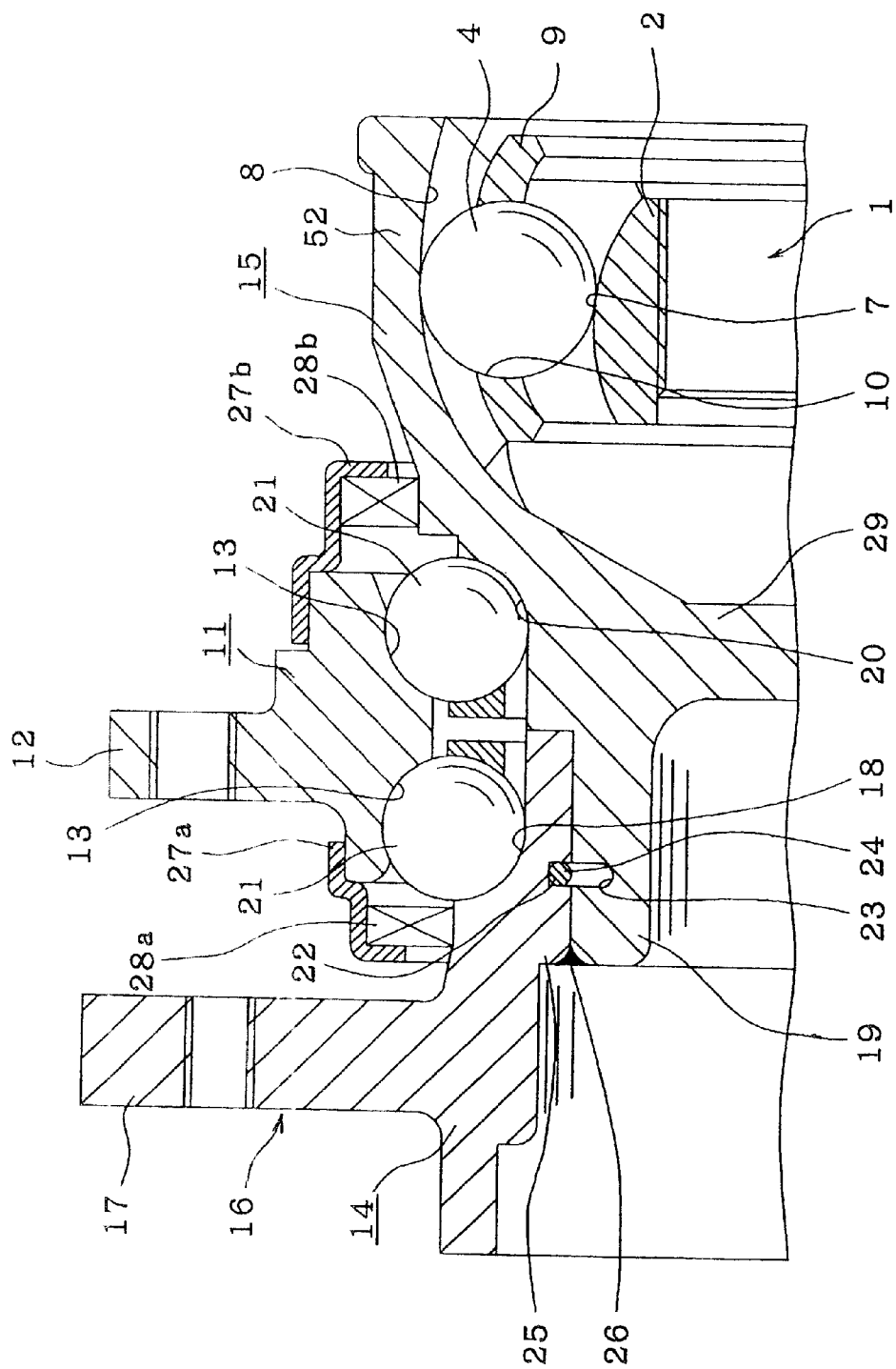
FIG. 1 is a cross sectional view of part of a conventional combination of rolling bearing unit and constant velocity joist for wheels.

This invention is applied to an eight ball constant velocity joint comprising an outer joint member (outer member or ring) having a plurality of axially extending curved guide grooves (engagement grooves) formed in the spherical inner surface thereof; an inner joint member (inner member or ring) having a plurality of axially extending curved guide grooves (engagement grooves) formed in the spherical outer surface thereof; a plurality of ball tracks defined between the guide grooves (engagement grooves) of the outer joint member (outer members or ring) and the guide grooves (engagement grooves) of the inner joint member (inner member or ring) corresponding thereto, the ball tracks being enlarged in wedge form in one sense of the axial direction; a torque transmitting ball (engagement ball) disposed in each of the plurality of ball tracks ; a cage having a plurality of pockets for storing the torque transmitting balls (engagement balls), wherein the number of the ball tracks and the number of the torque transmitting balls (engagement balls) disposed are eight.

Similar to the conventional rolling-bearing unit for wheels described above, the rolling-bearing unit for wheels of this invention in one feature comprises an outer ring or race that does not rotate when operated, and has a first installation flange on its outer peripheral surface for supporting it by the suspension and outer-ring raceways on its inner peripheral surface, and an inner ring or race that rotates when operated, and has a second installation flange formed on its outer peripheral surface on one end portion thereof for supporting the vehicle wheel, and inner-ring raceways on the middle portion thereof, and a housing portion that serves as the outer member or ring of a constant velocity joint on the other end portion thereof and multiple rolling members rotatably located between the outer-ring raceways and inner-ring raceways.

Moreover, of these components, the constant velocity joint comprises an inner ring that is attached to the end of the drive shaft a plurality of inner engagement grooves having an arc-shaped cross section that are formed perpendicular to the circumferential direction of the outer peripheral surface of the inner member or ring, a plurality of outer engagement grooves having an arc-shaped cross section that are formed perpendicular to the circumferential direction of the inner peripheral surface of the housing portion such that the outer engagement grooves face the inner engagement grooves, respectively, a cage or retainer that is held between the outer peripheral surface of the inner member or ring and the inner peripheral surface of the housing portion and formed with pockets in the positions in alignment with the inner and outer engagement grooves, and a plurality of balls (engagement balls) that are held inside the pockets to rotate freely along the inner and outer engagement grooves.

Particularly, in the constant velocity joint of this invention, there are seven or more inner and outer engagement grooves, and seven or more balls, and the diameters of the circumscribed circles of outer engagement grooves are smaller than the diameter of the inner-ring raceway on the side of the housing portion, and part of these outer engagement grooves overlap in the radial direction at least the part of the inner-ring raceway on the side of the housing portion.

The rolling-bearing unit for wheels of this invention constructed as described above is combined with the constant velocity joint, where there are seven or more inner and outer engagement grooves and seven or more balls, therefore, when the rolling-bearing unit operating, and torque is transmitted between the inner-ring or member and outer-ring or member, the size of the load applied to the balls can be made smaller than for the prior art construction.

Therefore, the outer diameter of the balls (engagement balls) can be reduced by that amount, and it is possible to reduce the diameter of the circumscribed circle made by these balls arranged in an annular shape as well as the diameter of the circumscribed circle of the outer engagement grooves.

Also, the diameters of these circumscribed circles can be made smaller than the diameter of the inner-ring raceway on the side of the housing portion and thus without making the diameter of the inner-ring raceway on the side of the housing larger, it is possible to overlap in the radial direction at least part of the inner-ring raceway on the side of the housing portion with part of the outer engagement grooves.

Moreover, it is possible to reduce the size in the axial direction of the rolling-bearing unit by the amount of this overlap, and make it more compact and lightweight.

Also in a second feature of the present invention, the rolling-bearing unit for wheels comprises all outer ring or race that does not rotate when operated, and has a first installation flange on its outer peripheral surface for supporting it by the suspension and outer-ring raceways on its inner peripheral surface, and an inner ring or race that rotates when operated, and has a second installation flange formed on its outer peripheral surface on one end portion thereof for supporting the vehicle wheel, and inner-ring raceways on the middle portion thereof, and a housing portion that serves as the outer member or ring of a constant velocity joint on the other end portion thereof, and multiple rolling members rotatably located between the outer-ring raceways and inner-ring raceways. The housing portion has an inner peripheral surface formed with a plurality of, specifically eight outer engagement grooves having an arc-shaped cross section that are formed perpendicular to the circumferential direction.

In the rolling-bearing unit of this embodiment constructed as described above, there are eight outer engagement grooves in the constant velocity joint, therefore, when the rolling-bearing unit operating, the size of the load applied to each of the balls in the constant velocity joint can be made smaller than for the prior art construction. Therefore, the outer diameter of the balls (engagement balls) can be reduced by that amount, and it is possible to reduce the diameter of the circumscribed circle made by these balls arranged in an annular shape as well as the diameter of the circumscribed circle of the outer engagement grooves. Moreover, it is possible to reduce the size of the outer diameter of the rolling-bearing unit by the amount of the reduction in the circumscribed circle of the outer engagement grooves, and make it more compact and lightweight.

The number of the outer engagement grooves is eight because the rotational force is stably transmitted through the constant velocity joint while the rolling bearing unit is made compact and lightweight and the durability of the constant velocity joint is secured.

Specifically, in order that the rotational force is stably transmitted trough the constant velocity joint of Rzeppa type having the outer engagement grooves, the outer and inner engagement grooves and balls in an even number are located on the diametrically opposite sides of the constant velocity joint. Six outer and inner engagement grooves and six balls are used in the conventional constant velocity joint, and the number of these is increased to eight or ten in order that the size of balls is reduced to intend to make the constant velocity joint compact and light weight. However, if this number is ten, the size of balls is too small to secure the load capacity of the balls. Consequently, the number of outer and inner engagement grooves and balls is eight.

The load capacity of the constant velocity joint, which affects its flaking life, is proportional to the $2/3$ power of the number of balls provided that the balls have the same diameter. The load capacity of the constant velocity joint with eight balls is 1.21 $((8/6)^{2/3})$ times that of the constant velocity joint with six balls. Thus, since the load capacity can be increased by about 21% with the number of balls increased. On the other hand, with the same load capacity, the diameter of balls cam be reduced by that amount. And, since the size of balls is reduced, the cross sectional area of the outer engagement grooves on the inner peripheral surface of the housing portion and the cross sectional area of the inner engagement grooves on the outer peripheral surface of the inner ring can be reduced by that amount. Consequently, the diameter of the constant velocity joint is reduced so that the rolling bearing unit for wheels, that is the fourth generation hub unit, can be made compact and light weight.

The constant velocity joint in another feature of this invention like the prior constant velocity joint described above, comprises an inner member or ring having inner engagement grooves arc-shaped in cross section that are equally spaced in the circumferential direction at eight locations on the outer peripheral surface of this inner ring and formed such that they are orthogonal to the circumferential direction, an outer member or ring provided around the inner ring and has outer grooves arcshaped in cross section formed around the inner peripheral surface of the outer ring and located such that they face the inner engagement grooves, and such that they are orthogonal to the circumferential direction, a retainer or cage that fits between the outer peripheral surface of the inner ring and the inner peripheral surface of the outer ring and that is formed with eight pockets around in the circumferential direction that line up with the inner and outer engagement grooves, and eight balls, with one ball held in each of the pockets such that they can rotate freely along the inner and outer grooves. These balls are located in a equally divided surface which crosses a plane that includes both of these center axes, equally dividing the axis crossing angle made by the center axis of the inner ring and the center axis of the outer ring.

In the constant velocity joint of this embodiment, the eight pockets are comprised of two kinds of pockets whose lengths in the circumferential direction differ, and which are alternated in the circumferential direction. Moreover, in tile case where the center axis of the inner ring and the center axis of the outer ring are greatly displaced when placing a ball inside each of the pockets, the maximum angle that the balls which have already been placed inside the pockets move in the circumferential direction is taken to be $\gamma_0$ (radian), and in the case where the center axis of the inner ring and the center axis of the outer ring of the constant velocity joint after completed are displaced to the maximum position during use, the maximum angle that the balls inside the pockets move in the circumferential direction is taken to be $\gamma_1$ (radian), and if the outer diameter of the retainer is taken to be Dc, and the difference in arc lengths in the circumferential direction of the two kinds of pockets on the outside of the retainer is taken to be $\Delta L$, then the size of the retainer and the pockets is regulated to satisfy the equation:

$$(\gamma_0-\gamma_1)\cdot Dc/2 \leq \Delta L \leq (\gamma_0-\gamma_1)\cdot Dc$$

With the constant velocity joint of this invention, constructed as described above, balls can be placed in each of the pockets, and the dimensions of the column sections between adjacent pairs of pockets in the circumferential direction are maintained, thus making it possible to sufficiently improve the durability of the retainer. As a results, it is possible to make the constant velocity joint more compact and contributes to making a fourth-generation hub unit, which integrates the outer ring of the constant velocity joint with the inner ring of the roller-bearing unit for supporting the road wheel.

It will be noted that the inner member or ring has a serration hole in its central portion as previously mentioned.

In the present embodiment of constant velocity joint, provided that $D_P$ represents the pitch circle diameter of eight balls, $D_B$ represents the diameter of balls, and $D_S$ represents the pitch circle diameter of the female serration on the inner peripheral surface of the serration hole, all the relations of $3.5 \leq D_P/D_B \leq 3.9$, $2.0 \leq D_P/D_S \leq 2.2$, $0.51 \leq D_B/D_S \leq 0.63$ are satisfied.

With the constant velocity joint of the present invention as constructed above, when the number of balls, six in the conventional structure, is increased to eight with the ball diameter reduced, the strength and durability of cage, inner ring and outer ring can be kept the same to those of the conventional structure with six ball installed.

Thus, a compact constant velocity joint with strength and durability kept in elements is achieved, so that the so-called fourth generation hub unit where the constant velocity joint is integrally combined with the inner ring of the hub unit is made practical.

The following are reasons of controlling the relations between the ball pitch circle diameter $D_P$, ball diameter $D_B$ and the female serration pitch circle diameter $D_S$ as mentioned above.

(1) the reason of $3.5 \leq D_P/D_B \leq 3.9$.

When the ball diameter $D_B$ is determined with reference to the ball pitch circle diameter $D_P$, the contact surface pressure between the rolling surface of the balls and the inside surfaces of the inner and outer engagement grooves can be set lower by enlarging the ball diameter $D_B$. Here, it should be noted that the cage must be formed with pockets for receiving such balls. Particularly, when installing the balls between the inner engagement groove and the outer engagement groove inside the pockets, and when operating the constant velocity joint, the pockets must be made sufficiently longer in the circumferential direction as the ball moves circumferentially in each pocket. Accordingly, as the ball diameter $D_B$ is larger, the column portions of the cage is shorter to reduce the strength of the cage. On the contrary, as the ball diameter $D_B$ is smaller, the column portions of the cage is longer to increase the strength of the cage, but the contact surface pressure between the rolling surfaces of the balls and the inside surfaces of the inner and outer engagement grooves is higher to reduce the durability of the inner and outer rings having the inner and outer engagement grooves, respectively.

In Table 1, the relations between the ratio ($D_P/D_B$) of the ball pitch circle diameter $D_P$ to the ball diameter $D_B$, the strength of the cage, and the contact surface pressure between the rolling surfaces of the balls and the inside surface of the inner and outer engagement grooves.

TABLE 1

| $D_P/D_B$ | 3.3 | 3.4 | 3.5 | 3.7 | 3.9 | 4.0 | 4.1 |
|---|---|---|---|---|---|---|---|
| Cage Strength | × | × | ○ | ○ | ○ | ○ | ○ |
| Contact Surface Pressure | ○ | ○ | ○ | ○ | ○ | × | × |

In Table 1, the mark ○ indicates "acceptable" and the mark X indicates "non-acceptable". The strength of the cage is based on the results of experiments, and the contact surface pressure between the ball rolling surface and the inside surface of the inner and outer engagement grooves is determined through calculation. When the contact surface pressure exceeds 42,000 $MP_a$ (428 $kgf/mm^2$), the mark X (non-acceptable) was given because the constant velocity joint with such contact surface pressure could not be smoothly operated.

Specifically, when the steel quench-hardened in the degree of HRc 60 to 64 for general use in the constant velocity joint is subjected to the contact surface pressure of 42,000 $MP_a$, the sum of permanent deformation amounts in the balls and the inside surfaces is about 0.0001 times the ball diameter $D_B$. If the sum of permanent deformation amounts exceeds this value, the balls are prevented from smoothly moving. From Table 1, the relation of $3.5 \leq D_P/D_B \leq 3.9$ is obtained between the ball pitch circle diameter $D_P$ and the ball diameter $D_B$.

(2) The reason of $2.0 \leq D_P/D_S \leq 2.2$.

Although a compact constant velocity joint is achieved by decreasing the ball diameter $D_B$ while increasing the number of balls, the ball diameter $D_B$ could not be infinitely made smaller. In addition, the range where the ball pitch circle diameter $D_P$ is set is limited by the ball diameter $D_B$ and the required length of the column portions in tide cage.

In Table 2, the relations are shown between the ratio ($D_P/D_S$) of the ball pitch circle diameter $D_P$, to the serration pitch circle diameter $D_S$ and the contact surface pressure between the ball rolling surface and the inside surfaces of the inner and outer engagement grooves.

TABLE 2

| $D_P/D_S$ | 1.9 | 2.0 | 2.1 | 2.2 | 2.3 |
|---|---|---|---|---|---|
| Contact Surface Pressure | × | ○ | ○ | ○ | not compact |

In Table 2, the mark ○ indicates "acceptable" and the mark X indicates "n on-acceptable". Incidentally, in the general constant velocity joint with six balls installed therein, conventionally used, the ratio $D_P/D_S$ is in the degree of 2.2 to 2.4. When the ratio $D_P/D_S$ exceeds 2.2, it is impossible to make it compact by increasing the number of balls from six to eight.

Therefore, from the results of Table 2, the relation between the ball pitch circle diameter $D_P$ and the female serration pitch circle diameter $D_S$ is controlled to $2.0 \leq D_P/D_S \leq 2.2$.

(3) The reason of $0.51 \leq D_B/D_S \leq 0.63$

The following relations are provided between the ball pitch circle diameter $D_P$, ball diameter $D_B$, female serration pitch circle diameter $D_S$;

$$3.5 \leq D_P/D_B \leq 3.9 \tag{1}$$

$$2.0 \leq D_P/D_S \leq 2.2 \tag{2}$$

From Formula (1), $$D_P/3.9 \leq D_B \leq D_P/3.5 \tag{3}$$

From Formula (2), $$D_P/2.2 \leq D_S \leq D_P/2.0 \tag{4}$$

From Formulas (3) and (4), $$2.0/3.9 \leq D_B/D_S \leq 2.2/3.5$$

$$0.51 \leq D_B/D_S \leq 0.63.$$

In the present invention, the ratio of the pitch circle diameter of the torque transmitting balls (engagement balls) to the diameter of the torque transmitting balls (engagement balls) can be within the range from 3.3 to 5.0. In addition to the ratio mentioned above, the ratio of the outer diameter of the outer joint member (outer member or ring) to the pitch circle diameter of the tooth profile (female serration) formed in the inner surface of the inner joint member (inner member or ring) can be within the range from 2.5 to 3.5.

The present invention can be applied to a constant velocity joint, wherein the plurality of pockets of the cage comprise short and long pockets which differ in their circumferential length, the pockets being spaced from each other at a distance of 180 degrees, the circumferential length of the short pockets being such that when this constant velocity joint transmits torque at the greatest angle, the torque transmitting balls (engagement balls) do not interfere with the circumferential wall surface of the short pockets, the circumferential length of the long pockets being such that during the incorporation of the torque transmitting balls (engagement balls) which is effected by relatively tilting the outer and inner joint members (outer and inner members or rings) to cause the short pocket to face outward through the opening in one axial end of the outer joint member (outer member or ring), previously incorporated torque transmitting balls (engagement balls) do not interfere with the circumferential wall surfaces of the long pockets.

Now, further explanation is made with reference to the drawings for the present invention.

Figure 11:
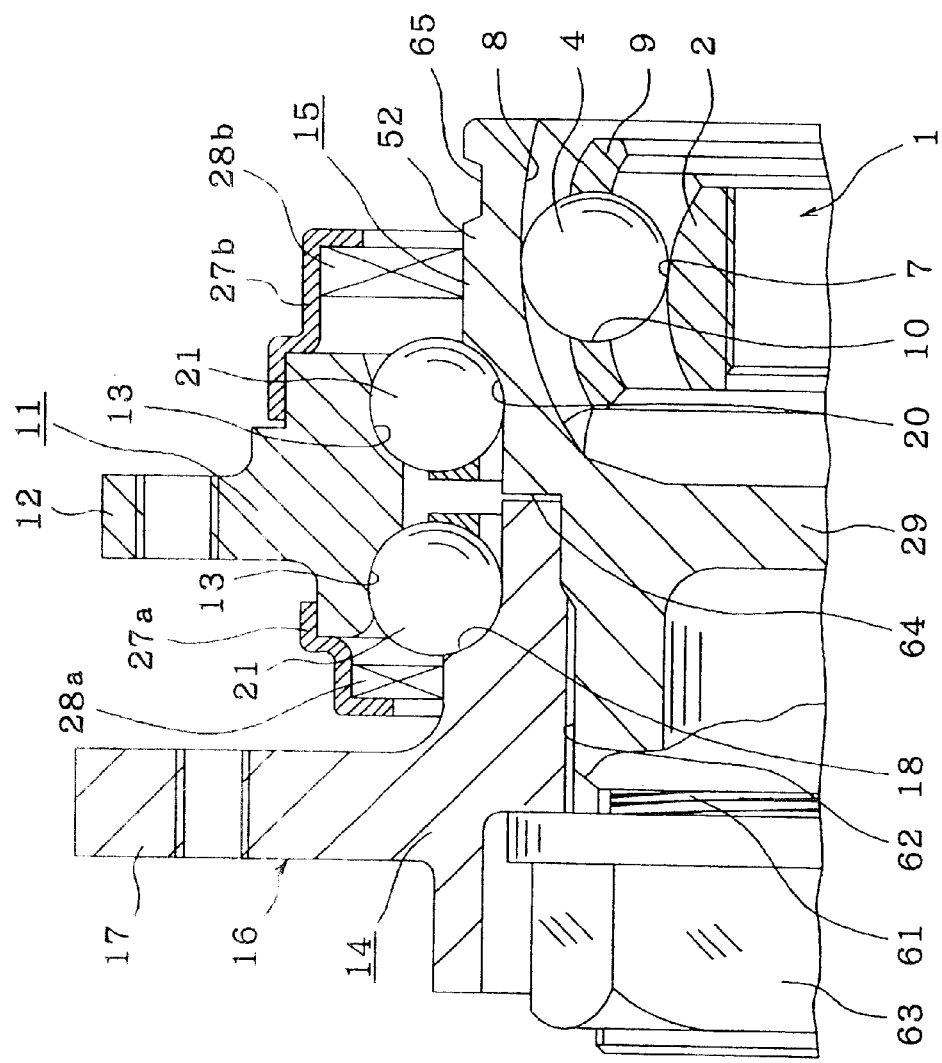
FIG. 11 is a cross sectional view of part of a combination of rolling bearing unit and constant velocity joint for wheels in an embodiment according to the present invention.

FIG. 11 shows a first embodiment of this invention. This embodiment is characterized by the construction of the constant velocity joint 1 which is integrally built into the rolling-bearing unit and which makes it possible to make the rolling-bearing unit more compact and lightweight. The construction and function of the other parts are nearly the same as those of the prior art construction shown in FIG. 1, and therefore the same symbols will used for identical parts, and any redundant explanation will be omitted The explanation here will only concentrate on the characteristic part of this invention and the parts that differ from the prior art construction.

The second inner race or ring 15, which makes up the hub or inner-ring or race assembly 16 together with the first inner race or ring 14, has a small-diameter male threaded section 61 on its one end in the axial direction (left end in FIG. 11), and a male serrated section 62 in the middle portion thereof. The first inner race or ring 14 fits over this male serrated section 62, and the inner peripheral surface of this first inner ring 14 is joined by the serrations with the outer peripheral surface in the middle portion of the second inner ring 15.

The outer diameter of the male threaded section 61 is smaller than the outer diameter of the male serrated section 62.

Also, by screwing a nut 63 on the male threaded section 61 and tightening it even further, the first ring 14 and second inner ring 15 are joined together, and adequate preload is applied to the rolling members 21, which are freely rotatably located between the outer-ring raceways 13 formed in the inner peripheral surface of the outer ring 11, and the first and second inner raceways 18, 20 formed around the outer peripheral surface of the first and second inner rings 14, 15.

The face at the other end in the axial direction (right end face in FIG. 11) of the first inner-ring 14 and the stepped section 64 located around the outer peripheral surface in the middle portion of the second inner-ring 15, do not completely come in contact with each other even when the preload is applied by the nut 63. Specifically, there is a small gap between the other end face of the first inner ring 14 and the stepped section 64 or at the most there is only very light contact between them.

Moreover, around the outer peripheral surface of the housing portion 52 of the constant velocity joint 1 provided on the other end portion (right end portion in FIG. 11) of the second inner-ring 15, an attachment groove 65 is formed to attache one end of a cylindrical boot (not shown in the figure) to cover the opening on the end of the housing portion 52.

The constant velocity joint 1 comprises at least seven inner engagement grooves 7 that are formed on the outer peripheral surface of the inner member or ring 2, at least seven outer engagement grooves 8 that are formed on the inner peripheral surface of the housing portion 52, and at least seven balls 4 that are located between these inner and outer engagement grooves 7, 8, (for example 9 to 12 of each), so that the load applied to the balls 4 when the rolling-bearing unit for wheels is operating becomes less than in the case of the prior art construction.

The inner engagement groove 7 and the outer engagement groove 8 are formed in an arcuate shape in the axial direction. The center of the arc of the inner engagement groove 7 is displaced in location with reference to the center of the arc of the outer engagement groove 8 toward one end in the axial direction (to the left in FIG. 11), so that the space between grooves 7 and 8 (the height in cross-section) is formed in a so-called wedge shape such that it becomes broader toward the other end (to the right in FIG. 11).

Moreover, it is possible to reduce the outer diameter of the balls 4 by an amount that corresponds to the amount that the load applied to the balls 4 is decreased, and the diameter of the circumscribed circle of the balls 4 arranged in an annular shape as well as the diameter of the circumscribed circle of the outer engagement grooves are less than the diameter of the second inner-ring raceway 20. This second inner-ring raceway 20 overlaps in the radial direction part of (the left part in FIG. 11) the outer engagement grooves 8.

For the rolling-bearing unit for wheels of this embodiment, constructed as described above, the function of rotatably supporting the vehicle wheel by the suspension is the same as in, the prior art rolling-bearing unit described above. Particularly, in his embodiment by making the diameter of the circumscribed circle of the outer engagement hooves 8 smaller than the diameter of the inner-ring raceway 20, this second inner-ring raceway 20 overlaps in the radial direction part of the outer engagement grooves 8. Therefore, it is possible to reduce the dimensions in the axial direction of the rolling-bearing unit by the amount of this overlap, and thus make the entire unit more compact and lightweight.

Figure 12:
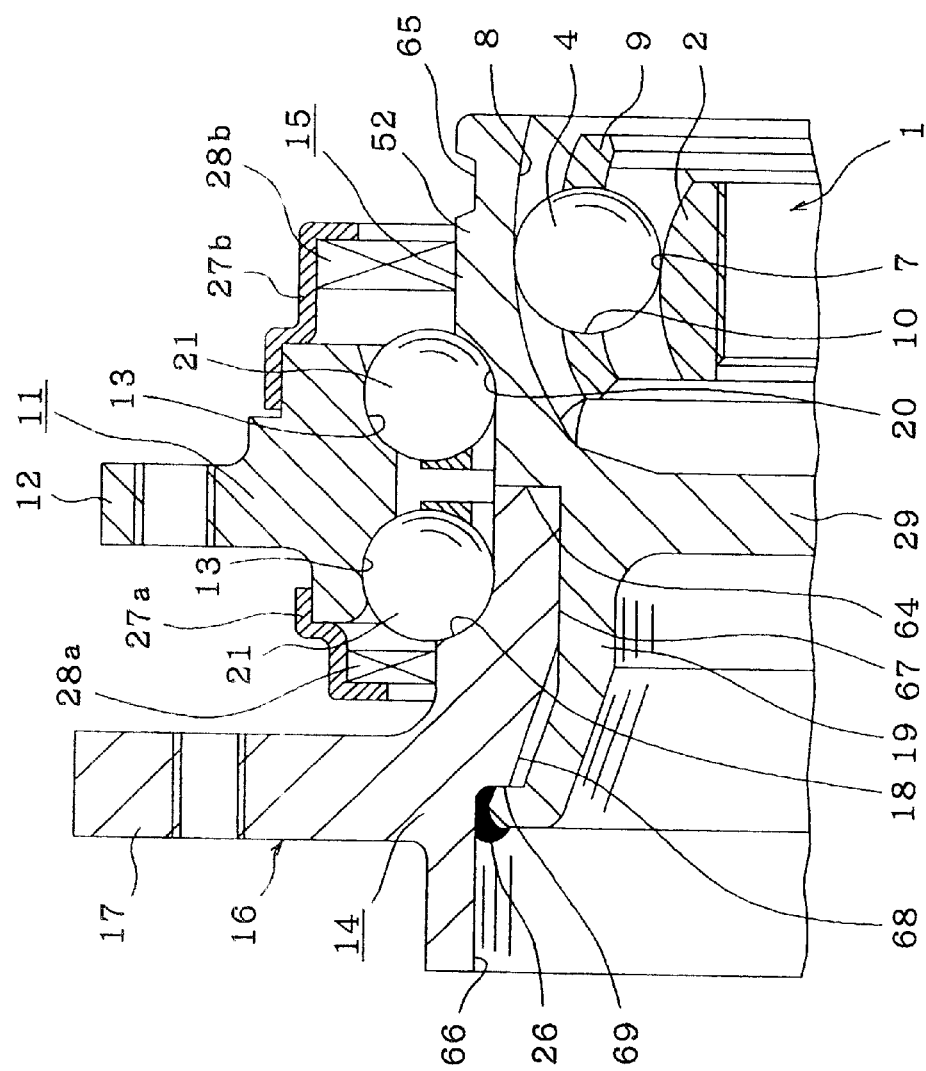
FIG. 12 is a cross sectional view of part of a combination of rolling bearing unit and constant velocity joint in a second embodiment according to the present invention.

Next, FIG. 12 shows a second embodiment of the invention the rolling-bearing unit for wheels of this embodiment has a first inner ring 14 around whose inner peripheral surface there is a larger-diameter section 66 at one end (left end in FIG. 12) and a smaller-diameter section 67 at the other end (right end in FIG. 12), where the larger-diameter section 66 and smaller-diameter section 67 are connected by a connecting section 68. This connecting section 68 is tapered such that its inner diameter gradually becomes larger as it goes from the smaller-diameter section 67 toward the larger-diameter section 66. There are serration grooves formed in this connecting section 68, and it has been quench hardened by induction hardening or the like.

Furthermore, there is a stepped section 69 located between the larger-diameter end of the connecting section 68 and the larger-diameter section 66.

On the other hand, the second inner ring 15, which together with the first inner ring 14 makes up the hub 16, has at one end thereof a cylindrical section 19 that can be inserted firmly into the smaller-diameter section 67 without play.

In the constant velocity joint 1, the housing portion 52 and a portion of the base half portion (right half in FIG. 12) of the cylindrical section 19, which fits inside the smaller-diameter section 67, are quench hardened by induction hardening or the like, while the tip half portion of the cylindrical section 19 (left half in FIG. 12) has not been hardened and is left as formed.

The outer peripheral surface of this cylindrical section 19, before connecting the first inner ring 14 with the second inner ring 15, is a single or straight cylindrical surface.

The hub 16 in this example may correspond to an inner ring assembly 130 described later.

To make the hub 16 by securely connecting the first inner ring 14 with the second inner ring 15, fist, the smaller-diameter section 67 of the first inner ring 14 is firmly fitted over the cylindrical section 19 of the second inner ring 15 without play, and the tip end face of this smaller-diameter section 67 (right end face in FIG. 12) comes in contact with the stepped section 64 that is formed around the outer peripheral surface of the base end portion of the cylindrical section 19. Also, with the first inner ring 14 in contact with this stepped section 64, the tip half portion of the cylindrical section 19 is strongly crimped to be spread open in the radially outer direction, and the tip end portion of the cylindrical section 19 is further crimped to be spread open toward the stepped section 69 to retain this stepped section 69. Since the tip half portion of the cylindrical section 19 is untreated, the serration grooves formed on the connecting section 68 bite into the outer peripheral surface of the tip halfportion of the cylindrical section 19 during the crimping process. In this state, the first and second inner rings 14, 15 interlockingly fit together in a land and recess engagement in the circumferential direction between the outer peripheral surface of the tip half portion of the cylindrical section 19 and the connecting section 68. Therefore, large torque can be transmitted between the first inner ring 14 and the second inner ring 15.

The stepped section 64 etc. are controlled in position such that an adequate preload is applied to the rolling members 21 when the first inner ring 14 is abutted to the stepped section 64. Also, between the tip end edge of the cylindrical section 19 and a portion of the inner peripheral surface of the first inner ring 14 on the inner diameter side of the second installation flange 17, there is a weld 26 which prevents the portion in the tip half portion of the cylindrical section 19 in engagement with the serration grooves from becoming smaller in the inner diameter.

The weld 26 does not need to be used for transmitting torque between the first and second inner rings 14, 15. Therefore, in order that the inner-ring raceway 18 formed on the outer peripheral surface closer to the other end (closer to the right end in FIG. 12) of the first inner ring 14 is not affected by heat, a small raised weld or spot welds that are arranged intermittent around the circumference will suffice.

In the rolling-bearing unit for wheels of this invention, constructed as described above, the engagement between the outer peripheral surface of the tip half portion of the cylindrical section 19 and the serration grooves makes it possible to connect the first inner ring 14 with the second inner rings 15, securely preventing them from rotating with respect to each other.

Also, the weld 26 between the tip end edge of the cylindrical section 19 and the inner peripheral surface of the first inner race or ring 14 prevents the tip half portion of the cylindrical section 19 in engagement with the serration grooves from becoming smaller in inner diameter. Therefore, even if the unit is used for a long period of time, the first and second inner race or rings 14, 15 are securely connected with each other and prevented from rotating with respect to each other, and it is securely possible to rotate and drive the front wheel by way of the constant velocity joint 1.

Regardless of the few number of parts, the fist and second inner rings 14, 15 are securely connected to each other so that large torque can be transmitted, and other than changing the construction of this connection between the first and second inner rings 14, 15, the other construction and function is substantially the same as those of the first embodiment described above.

Figure 13:
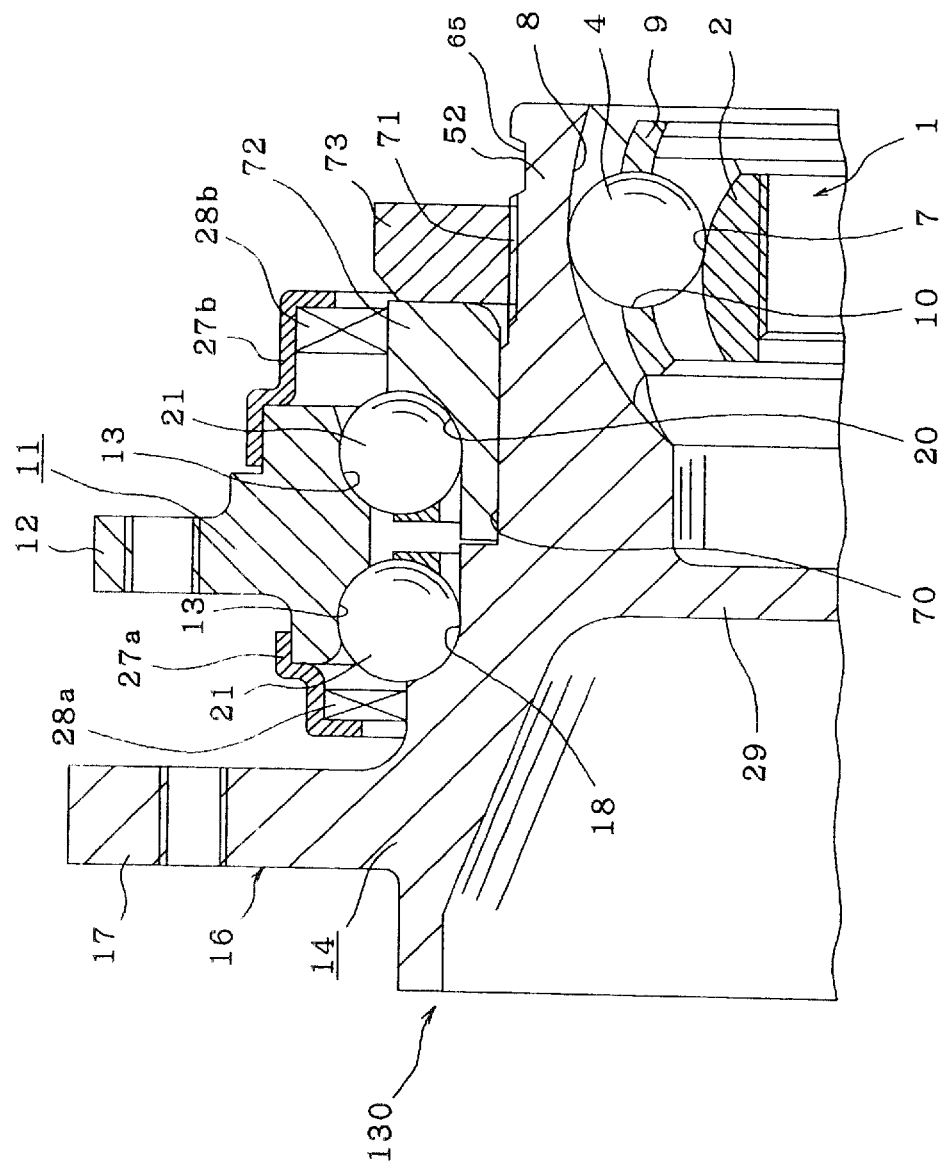
FIG. 13 is a cross sectional view of part of a combination of rolling bearing unit and constant velocity joint in a third embodiment according to the present invention.

Next, FIG. 13 shows a third embodiment of the invention In this embodiment, the housing portion 52, which serves as the outer member or ring of the universal joint 1, is formed in one piece with the other end portion (right end portion in FIG. 13) of the first inner race or ring 14. Also, the first inner race or ring 14 has a smaller-diameter stepped section 70 in the middle portion in the axial direction at a location separated from the inner-ring raceway 18, and likewise has a male threaded section 71 closer to the other end that has a smaller diameter than the smaller-diameter stepped section 70.

The second inner race or ring 72, which makes up an inner ring assembly 130 together with the hub 16 and the first inner race or ring 14, fits over the smaller-diameter stepped section 70.

The second inner-ring raceway 20 is formed around the outer peripheral surface of this second inner ring 72. Moreover, the dimension of this second inner ring 72 in the axial direction is larger than the dimension in the axial direction of the smaller-diameter stepped section 70. Therefore, with the second inner ring 72 fitted over the smaller-diameter stepped section 70, the other end portion (right end portion in FIG. 13) of this second inner ring 72 sticks out from the end edge (right end edge in FIG. 13) of the smaller-diameter stepped section 70 closer to the male threaded section 71.

Also, with the second inner ring 72 fitted over the smaller-diameter stepped section 70, as described above, a nut 73 is screwed on to the male threaded end portion 71 and by further tightening, the first inner ring 14 and second inner ring 72 are joined together and an adequate preload is applied to the rolling members 21 that are freely rotatably located between the outer-ring raceways 13 formed around the inner peripheral surface of the outer ring or outer-ring assembly 11 and the first and second inner-ring raceways 18, 20 formed around the outer peripheral surface of the first inner ring 14 and second inner ring 72.

One end face (left end face in FIG. 13) of the second inner ring 72 and the stepped surface formed on one end portion (left end portion in FIG. 13) of the smaller-diameter stepped section 70 do not come in complete contact even when the preload is applied by the nut 73. Specifically, there is a small gap, or extremely light-pressure contact between the one end face and the stepped section.

In the case of the rolling-bearing unit for wheels of this embodiment, constructed as described above, the housing portion 52 of the constant velocity joint 1, and the second installation flange 17 which supports the vehicle or road wheel are formed in one piece with the first inner ring 14. Therefore, the vehicle wheel that is attached to the second installation flange 17 can be directly rotated by the rotational driving force that is transmitted to the housing portion 52 from the drive shaft (not shown in the figure). Even if operated for long periods of time, it is possible to maintain durability of the hub 16, and to transmit large torques. Moreover, the preload is applied to the rolling members 21 by the nut 73 at a portion independent from the section which transmits the rotational driving force. Therefore, an adequate preload is applied regardless of the size of the rotational driving force to be transmitted. Other than the changes made to the construction of the hub 16, all other construction and functions are substantially the same as those of the first embodiment described above.

Figure 14:
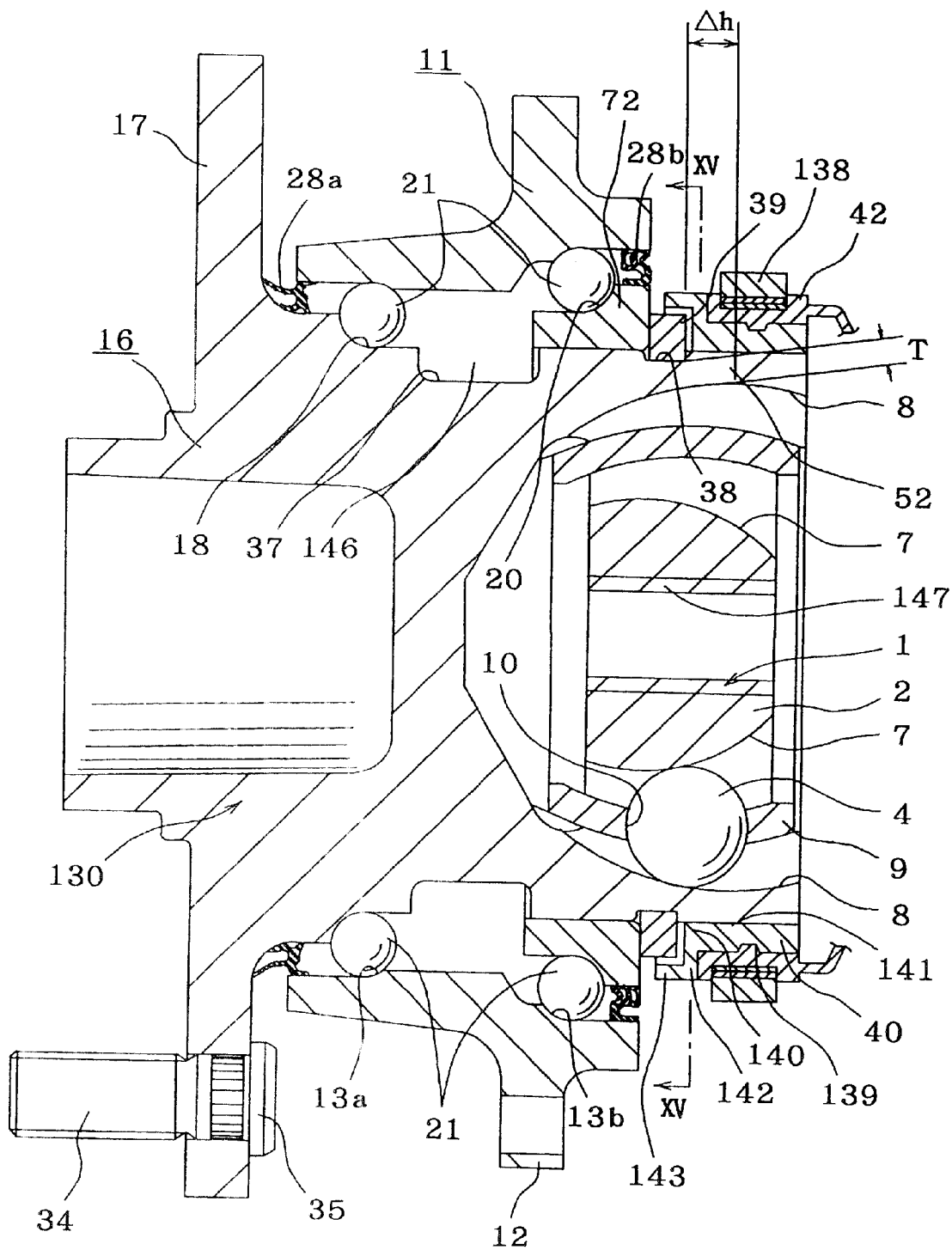
FIG. 14 is a cross sectional view of part of a combination of rolling bearing unit and constant velocity joint in a fourth embodiment according to the present invention.
Figure 15:
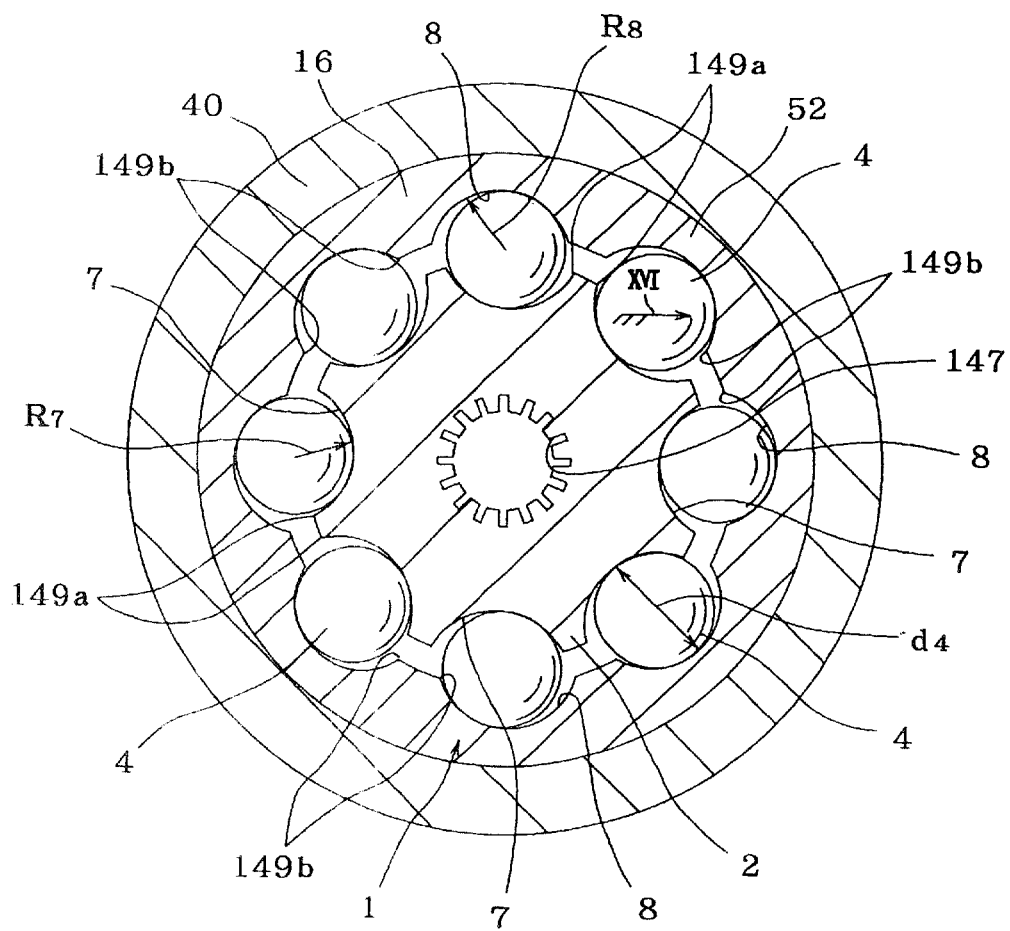
FIG. 15 is a cross sectional view taken along the line XV—XV in FIG. 14 to show only the constant velocity joint with the cage omitted.
Figure 16:
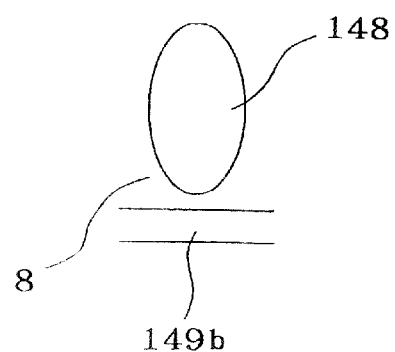
FIG. 16 is a view taken as indicated by Arrow XVI in FIG. 15 to show a contact ellips between the rolling surface of the balls and the outside groove.

FIGS. 14 to 16 show another embodiment of the present invention. This rolling bearing unit has an outer race or ring assembly 11 that does not rotate when supported by the suspension and has an outer peripheral surface formed with a first installation flange 12 for supporting it with the suspension device and an inner peripheral surface formed with a double row of outer ring raceways 13a, 13b. Disposed on the inner diameter side of the outer ring 11 is an inner ring assembly 130 which is comprised of a hub 16 and an inner race or ring 72 and arranged concentric with the outer ring 11.

Disposed on the outer peripheral surface of the inner ring assembly 130 are first and second inner ring raceways 18, 20 mating to the outer ring raceways 13a, 13b. The first inner ring raceway 18 is directly formed on the outer peripheral surface of the middle portion of the hub 16. The inner ring 72 is fitted onto the middle portion of the hub 16 at a position closer to the axially inner end (right end in FIG. 14) than the first inner ring raceway 18. The second inner ring raceway 20 is formed on the outer peripheral surface of the inner ring 72. A plurality of rolling members 21 are rotatably provided between the outer ring raceways 13a, 13b and the first and second inner ring raceways 18, 20, so that the inner ring assembly 130 is rotatably supported inside the outer ring 11.

In the embodiment as illustrated, the first inner ring raceway 18 is directly formed on the outer peripheral surface of the hub 16, so that the diameter of the first inner ring raceway 18 is smaller than the diameter of the second inner ring raceway 20 on the outer peripheral surface of the inner ring 72. Consequently, the diameter of the outer ring raceway 13a opposed to the first inner ring raceway 18 is smaller than the outer ring raceway 13b. The outer ring raceway 13a is located on the axially outer side (left side in FIG. 14, widthwise outer side when installed in the automobile), while the outer ring raceway 13b is located on the axially inner side (right side in FIG. 14, widthwise central side when installed in the automobile).

The outer diameter of the axially outer half portion of the outer ring 11 with the outer ring raceway 13a is smaller than the outer diameter of the axially inner half portion of the outer ring 11 with the outer ring raceway 13b. In the embodiment as illustrated, the first inner ring raceway 18 and the outer ring raceway 13a on the outer side are smaller in diameter, so that the number of the rolling members 21 between the first inner ring raceway 18 and the outer ring raceway 13a is smaller than the number of the rolling members 21 between the second inner ring raceway 20 and the outer ring raceway 13b.

Integrally provided on the outer peripheral surface of the hub 16 at the axially outer end thereof is a second installation flange 17 for supporting a vehicle wheel to the hub 16, to which the base end portion of the studs 34 for mounting the vehicle wheel is fixed.

In the embodiment as illustrated, the pitch circle of the studs 34 has a diameter which is smaller by an amount that the outer diameter of the axially outer half portion of the outer ring 11 is smaller than the outer diameter of the axially inner half portion of the outer ring 11 in a degree that the head 35 of the studs 34 does not interfere with the outer peripheral surface of the outer ring 11 at the outer end thereof.

With the outer peripheral surface of the hub 16, the portion located axially inward than the first inner ring raceway 18 has a diameter smaller than the diameter of the inscribed circle of the rolling members 21 corresponding to the first inner ring raceway 18. This is because upon assembling the rolling bearing unit with wheels, rolling members 21 are installed on he inner diameter side of the outer ring raceway 13a on the inner peripheral surface at the axially outer end of the outer ring 11 while the hub 16 is inserted on the inner diameter side of the outer ring 11 with the seal ring 28a fitted into the inner peripheral surface at the axially outer end of the outer ring 11.

On the outer peripheral surface of the middle portion of the hub 16, a recessed groove portion 37 is circumferentially formed to reduce the weight of the hub 16.

In order that the inner ring 72 fitted onto the hub 16 is prevented from being displaced axially inwards, and that the preload applied to the rolling members 21 between the outer ring raceways 13a, 13b and the first and second inner ring raceways 18, 20 is kept at a proper value, a stop ring 39 is attached in the recessed groove 38 circumferentially formed at a portion closer to the axially inner end on the outer peripheral surface of the hub 16. The stop ring 39 comprises a pair of semi-circular arcuate pieces. The stop ring 39 has an inner peripheral edge portion engaged with the recessed groove 38 forcing the inner ring 72 axially outward with respect to the hub 16 to apply a proper preload to the rolling members 21.

The thickness of the stop ring 39 is selected such that even when the force pressing the inner ring 72 axially outward is released, the proper preload is kept to be applied to the rolling members 21.

Specifically, a plurality of kinds of stop rings having different sizes in thickness, the difference being small, are prepared for the stop ring 39, and a proper one is selected having a suitable thickness with reference to the components of the rolling bearing unit for engagement with the recessed groove 38.

It is desired that the recessed groove 38 is located at a position axially separated by Δh from the maximum diameter portion of the outer engagement groove 8 so as to have a sufficient thickness to bear any stress concentration which may be produced on the bottom of the recessed groove 38, and that the minimum distance T between the recessed groove 38 and the outer engagement groove 8 is in the range of from 2.5 mm to 4.0 mm taking into consideration the strength and compassion Specifically, if the distance T is less than 2.5 mm, the strength is insufficient and any breakage may occur. If the distance T is larger than 4.0 mm, although the strength is sufficient the too large diameter and heavy weight will not meet the needs for compaction.

Provided around the stop ring 39 is part of a sleeve 40 which prevents the stop ring 39 from being erroneously dropped off from the recessed groove 38 by way of the radially outward displacement of the pair of pieces of the stop ring 39. The sleeve 40 is fitted onto the boot 42 for supposing the axially outer end portion of the boot 42 to prevent foreign matter such as rain water or dust from entering the constant velocity joint 1 including the housing portion 52 at the axially inner end of the hub 16.

The boot 42 is made of an elastic material Se rubber, synthetic resin and integrally formed to have a bellows shaped middle portion and cylindrical opposite end portions.

The sleeve 40 is made of a metal and fitted onto the axially inner end portion of the hub 16 by interference fitting, and the axially outer end portion of the boot 42 is fitted onto the sleeve 40 and retained by a retaining band 138 fitted onto the outer peripheral surface of the sleeve 40.

The inner peripheral surface at the axially outer end of the boot 42 is generally circumferentially engaged with the groove 139 on the outer peripheral surface of the sleeve 40.

The portion at the axially outer end edge of the sleeve 40 projecting from the boot 42 axially outward is formed in a crank shape in cross section, to form generally circumferentially the retaining portion 140. In order to form the retaining portion 140, the sleeve 40 comprises a smaller diameter cylindrical portion 141 securely fitted onto the axially inner end portion of the hub 16, a circular ring portion 142 extending radially outward from the axially outer end edge of the smaller diameter cylindrical portion 141, and a larger diameter cylindrical portion 143 extending axially outward from the outer peripheral edge of the circular ring portion 142.

The axially outer surface of the circular ring portion 142 is placed in contact with or approximately opposed close to the axially inner surface of the stop ring 39, while the inner peripheral surface of the larger diameter cylindrical portion 143 is placed in contact with or approximately opposed close to the outer peripheral surface of the stop ring 39.

A seal ring 28a is provided between the inner peripheral surface at the axially outer end of the outer ring 11 and the outer peripheral surface at the middle portion of the hub 16 while a seal ring 28b is provided between the inner peripheral surface at the axially inner end portion of the outer ring 11 and the outer peripheral surface at the axially inner end portion of the inner ring 72 so as to cover the opening at the opposite ends of the space where the rolling members 21 are located.

Figure 6:
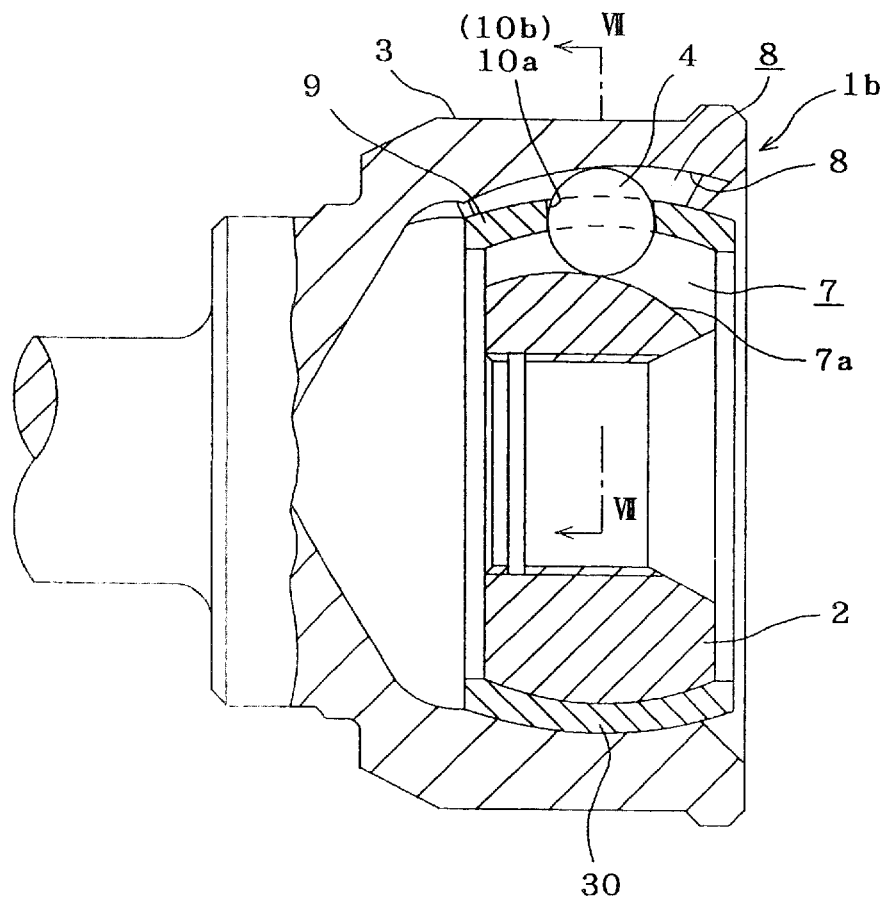
FIG. 6 is a partly cut-away elevational view of another conventional constant velocity joint where no joint angle is applied.
Figure 7:
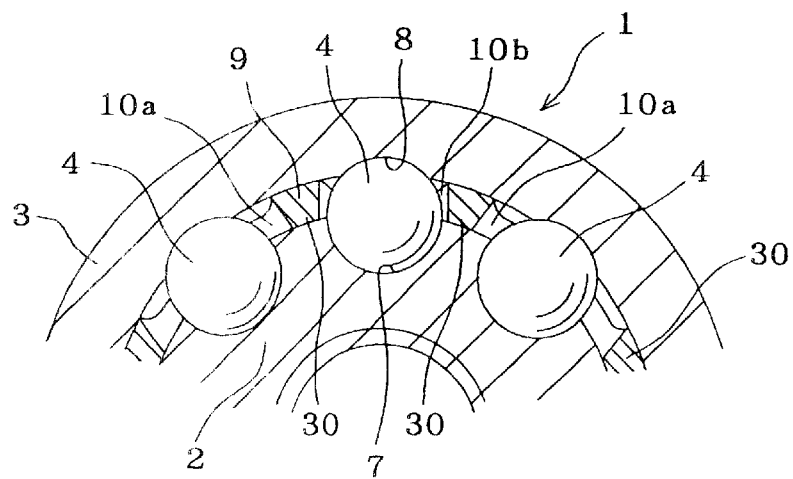
FIG. 7 is a view taken along the line VII—VII of FIG. 6.
Figure 8:
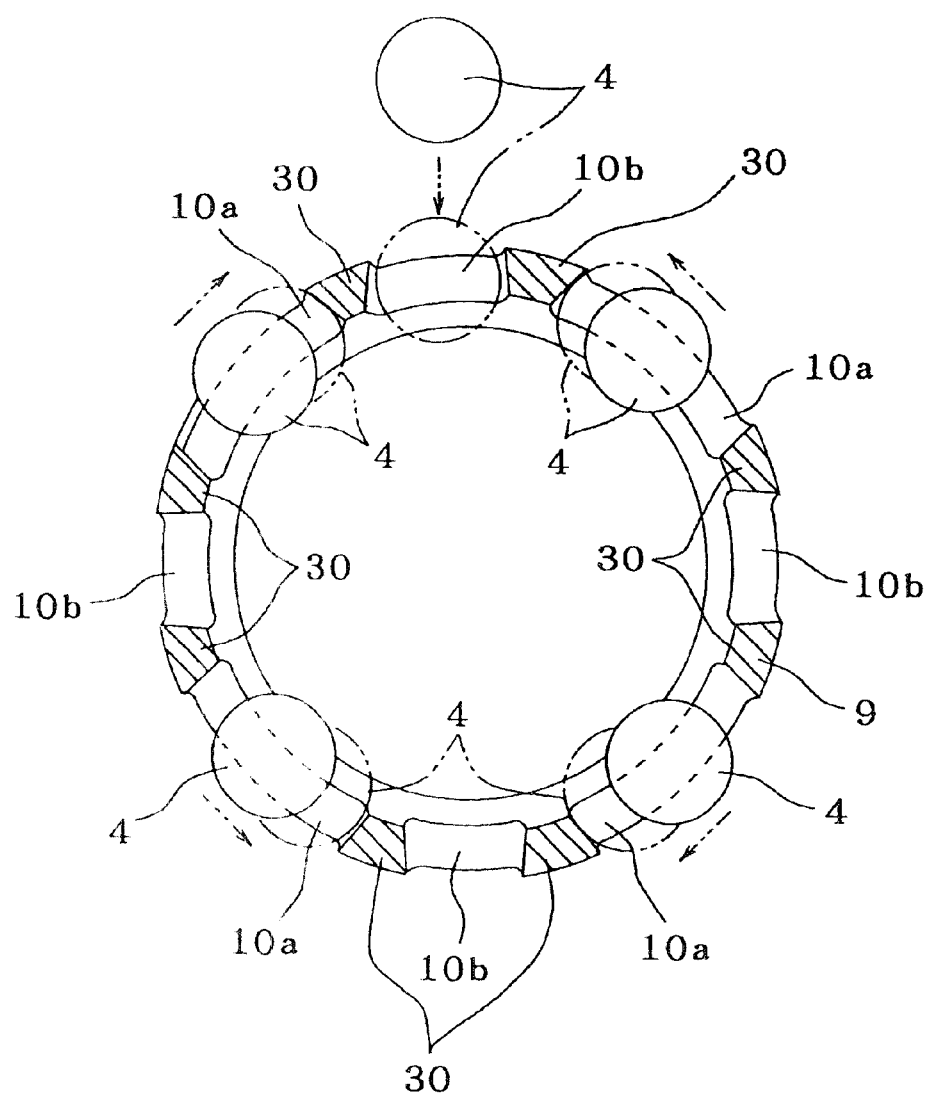
FIG. 8 is a cross sectional view of a cage installed in the another conventional structure.
Figure 9:
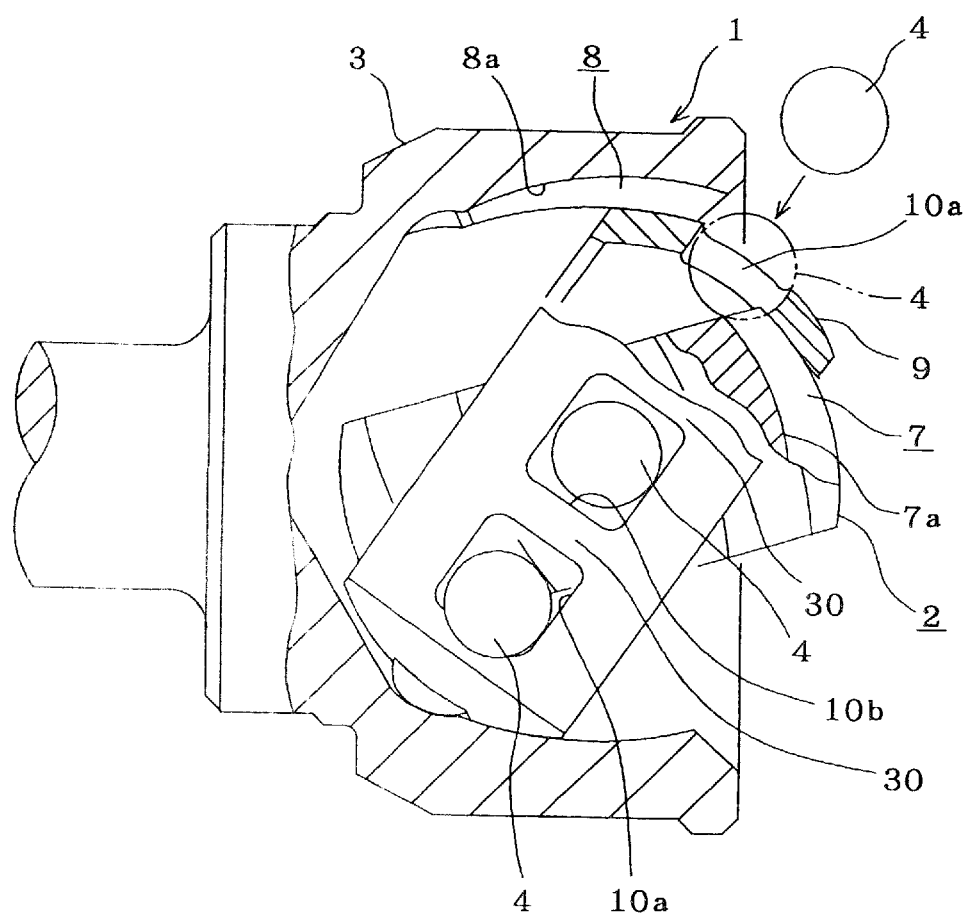
FIG. 9 is a cross sectional view of part of a constant velocity joint where the inner and outer rings are displaced in a predetermined direction to install balls in the cage.

Fitted into the axially outer end portion of the boot 42 and the inner ring 72 is a portion of the axially inner end of the hub 16 which is a housing portion 52 to be an outer member or ring (see 3 in FIG. 6) of the constant velocity joint 1. Formed on the inner peripheral surface of the housing portion 52 are eight outer engagement grooves 8 which have an arcuate cross section and extend transverse to the circumferential direction (left and right directions in FIG. 14, front and rear directions of FIG. 15).

Provided inside the housing portion 52 is an inner member or ring 2 which cooperates with the housing portion 52 to form the constant velocity joint 1 of the Rzeppa type. Eight inner engagement grooves 7 extend transverse to the circumferential direction on the outer peripheral surface of the inner ring 2.

Disposed between each of the inner engagement grooves 7 and each of the outer engagement grooves 8 is a single ball 4, and therefore totally eight balls 4, which is rotatably held in the pocket 10 of the cage 9.

Axially formed in the central portion of each of the inner rings 2 is an axially extending spline hole 147 with which an end portion of the drive shaft (not shown) is engaged when installed in an automobile, thus the hub 16 is driven to rotate by way of the inner ring 2 and the eight balls 4.

In the operation of the rolling bearing unit of the present embodiment, since eight inner and outer engagement grooves 7, 8 and eight balls 4 are used in the constant velocity joint 1, upon torque transmission between the inner ring assembly 130 and the outer ring 11 during use of the rolling bearing unit, the load applied to each of the balls 4 of the constant velocity joint 1 can be made smaller than in the case of the conventional structure as previously mentioned.

Accordingly, by that amount, the balls 4 in an annular arrangement can be made smaller, respectively, and the diameter of the circumscribed circle of the balls 4 and the diameter of the circumscribed circle of the outer engagement grooves 8 can be made smaller.

By the amount that the diameter of the circumscribed circle of the outer engagement grooves 8 is made smaller, the outer diameter of the rolling bearing unit can be made smaller to provide a generally compact and light weight apparatus.

Particularly, as in the embodiment illustrated, if the axially outer half portion of the outer engagement grooves 8 is located on the inner diameter side of the second inner ring raceway 20, not only the outer diameter but also the axial size of the rolling bearing unit are made smaller to make effectively the whole apparatus compact and lightweight.

In this construction, the second inner ring raceway 20 of the main body of the rolling bearing unit must be larger in diameter than the outer engagement grooves 8, leading to a larger diameter of the rolling bearing unit. Accordingly, the number of balls 4 is increased from six to eight, and thus, the outer diameters of the balls 4 and of the rolling bearing unit are effectively reduced.

The ratio of the pitch circle diameter of the balls 4 to the diameter of the balls is in the range from 3.3 to 5. If this ratio is less than 3.3, the width of the column sections between the adjacent pockets in the cage is too small, and the strength of the column sections of the cage is insufficient. On the contrary, if this ratio is larger than 5, the width size of the column sections between the adjacent pockets is excessively large. In other words, the ball diameter is too small, and the load capacity of the constant velocity joint is small, which is not desirable from the point of durability.

In addition, by making smaller the diameter of the pitch circle of the rolling members 21 in the axially outer row, the diameter of the axially outer half portion of the outer ring 11 can be reduced. And by that amount, the diameter of the pitch circle of the studs 34 fixed to the second installation flange 17 on the outer peripheral surface of the hub 16 can be reduced.

Accordingly, without enlarging the axial size of the hub 16, the outer diameter of the second installation flange 17 for supporting the studs 34 for fixing is reduced, so that the rolling bearing unit can be effectively made compact and lightweight.

As the diameter of the pitch circle of the rolling members 21 in the axially outer row is smaller than the diameter of the pitch circle of the rolling members 21 in the axially inner row, the basic dynamic rate load of the axially outer row portion is smaller than the basic dynamic rate load of the axially inner row portion. Accordingly, if the same load is applied to the both rows, the life of the axially outer row portion is inclined to be shorter than the life of the axially inner row portion.

On the other band, in the usual automobiles, the load applied to the axially outer row portion is smaller than the load applied to the axially inner row portion. Therefore, it is easy to make a design to substantially equalize the lives of the both rows, so that the wasteless design can be achieved.

Although the balls are used for the rolling members 21 in the illustrated embodiments, tapered rollers can be used for the rolling members in the heavy automobiles, which is covered by the present invention.

In operation of the present embodiments, if the relation between the radius of curvature $R_7$, $R_8$ of the cross section of the inner and outer engagement grooves 7, 8 of the constant velocity joint 1 and the outer diameter $d_4$ of the balls 4 is the same as that of the conventional structures, the flaking life of the rolling surface of the balls 4 may not be secured. Therefore, in working the present embodiments, it is desirable that the radius of curvature $R_7$, $R_8$ of the cross section of the inner and outer engagement grooves 7, 8 of the constant velocity joint 1 is made a little larger than those of the conventional structures with reference to the outer diameter $d_4$ of the balls 4.

The reason of this is explained with reference to FIGS. 15 and 16.

The inner and outer engagement grooves 7, 8 and the balls 4, exaggerated in size in FIG. 15, are displaced toward to make the rolling surface of the balls 4 in contact with one side surface of the grooves 7, 8 during the transmission of rotational force between the inner ring 2 and the housing portion 52 of the constant velocity joint 1. This makes the balls 4 to move toward the opening portion of the inner and outer engagement grooves 7, 8 in a riding-up manner.

Simultaneously, the rolling surface of the balls 4 comes into contact with the inner surfaces of the inner and outer engagement grooves 7, 8 at the contact ellipse portion the longer diameter of which extends to the circumferential direction of the constant velocity joint 1. For example, the rolling surface of the balls 4 comes into contact with the inner surfaces of the inner and outer engagement grooves 7, 8 at the portion of the contact ellipse 148 as illustrated in FIG. 16.

The inner and outer engagement grooves 7, 8 are formed with a chamfered portion 149a, 149b along the whole length of the grooves 7, 8, respectively.

Corresponding to the displacement as mentioned above, the contact ellipse 148 with respect to the balls 4 moves toward the opening portion of the grooves 7, 8, and when the contact ellipse 148 reaches the portion of the chamfered portions 149a, 149b, an edge load is produced at this portion. This edge load would reduce the flaking life of the rolling surface of the balls 4 to reduce the durability of the constant velocity joint 1. This is undesirable.

In order to prevent the reduction of durability caused as mentioned above, the contact ellipse 148 must be prevented from reaching the chamfered portions 149a, 149b.

In the case of the conventional constant velocity joint, the radius of curvature of the cross section of the inner and outer engagement grooves is about 0.504 to 0.51 times the outer diameter of the balls (50.4% to 51% of the outer diameter of the balls), in other words, only slightly larger than the radius of curvature of the rolling surface, and therefore the longer diameter of the contact ellipse is larger so that the end portion of the contact ellipse easily reaches the chamfered portions 149a, 149b.

In working the present embodiments, it is desirable that the radius $R_7$, $R_8$ of curvature of the cross section of the inner and outer engagement grooves 7, 8 is about 0.51 to 0.52 times the outer diameter $d_4$ of the balls 4 (51% to 52% of the outer diameter $d_4$ of the balls 4). In other words, the degree that the radius of curvature of the cross section of the grooves is larger than the radius of curvature of the rolling surface is slightly increased. Consequently, the longer diameter of the contact ellipse 148 is smaller, it is hard for the end portion of the contact ellipse to reach the chamfered portions 149a, 149b. As a result the edge load is hardly applied to the rolling surface of the balls 4, to increase the flaking life of the rolling surface and the durability of the constant velocity joint 1. Or, if the same durability is required, the rolling bearing unit including the constant velocity joint can be further made compact and light weight.

Incidentally, the longer diameter of the contact ellipse can be made shorter by enlarging the radius of curvature of the cross section at the portion closer to the opening of the both grooves 7, 8. The radius of curvature of the cross section at the middle portion of the both grooves 7, 8 can be the same as that of the conventional structures. Accordingly, the cross section of the both grooves 7, 8 can be formed in a semi-ellipse shape, or Gothic arch shape.

These embodiments of the present invention, constructed and functioning as described above, make it possible to make the rolling-bearing unit for wheels more compact and lightweight, and make it possible to improve the performance of the vehicle in which this rolling-bearing unit is installed.

FIGS. 17 thru 21 show another embodiment of the constant velocity joint of the fourth-generation hub unit of this invention. The outer ring 11 is supported by the suspension and does not rotate, and has an outer peripheral surface formed with a first installation flange 12 for attaching it to the suspension, and an inner peripheral surface formed with outer-ring raceways 13. The inner nag assembly 130, which comprises a hub unit 16 and inner ring 72, is placed radially inside the outer ring 11 such that it is concentric with the outer ring 11. First and second inner-ring raceways 18, 20 are formed around the outer peripheral surface of the inner ring assembly 130 such that they face the outer-ring raceways 13. Of these inner-ring raceways 18, 207 the first inner-ring raceway 18 is formed directly in the outer peripheral surface in the middle portion of the hub unit 16. Moreover, fitted onto the middle portion of this hub unit 16, further on the inner end inside than where the first inner-ring raceway 18 (right end side in FIG. 17), is the inner ring 72 on the outer surface of which the second inner-ring raceway 20 is formed. Also, by placing several rolling members 21 between the outer-ring raceways 13 and the first and second inner-ring raceways 18, 20 so that they can rotate freely, the inner ring assembly 130 is supported so that it can rotate freely on the inside of the outer ring 11.

Figure 17:
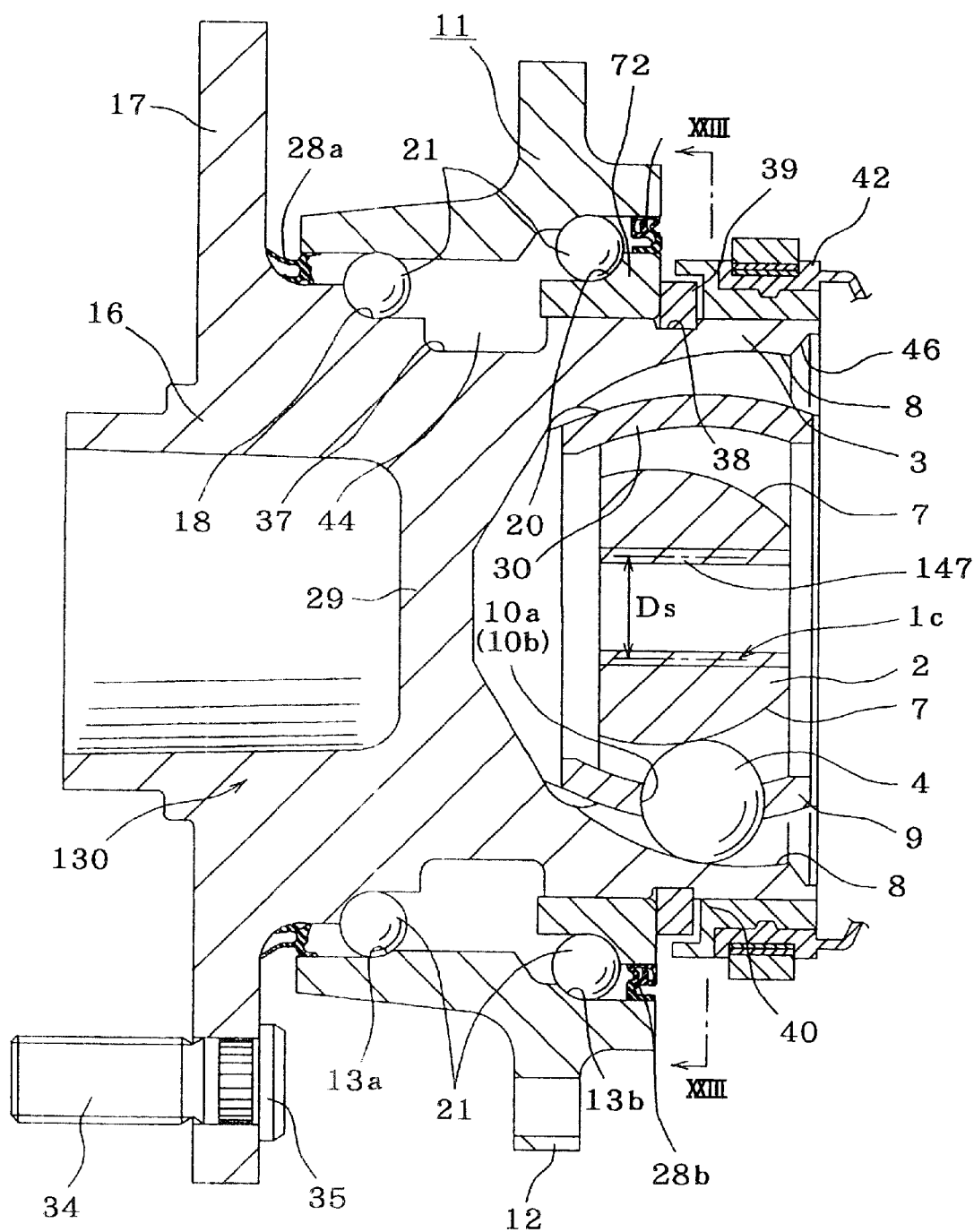
FIG. 17 is a cross sectional view of a fifth example of the present invention.
Figure 18:
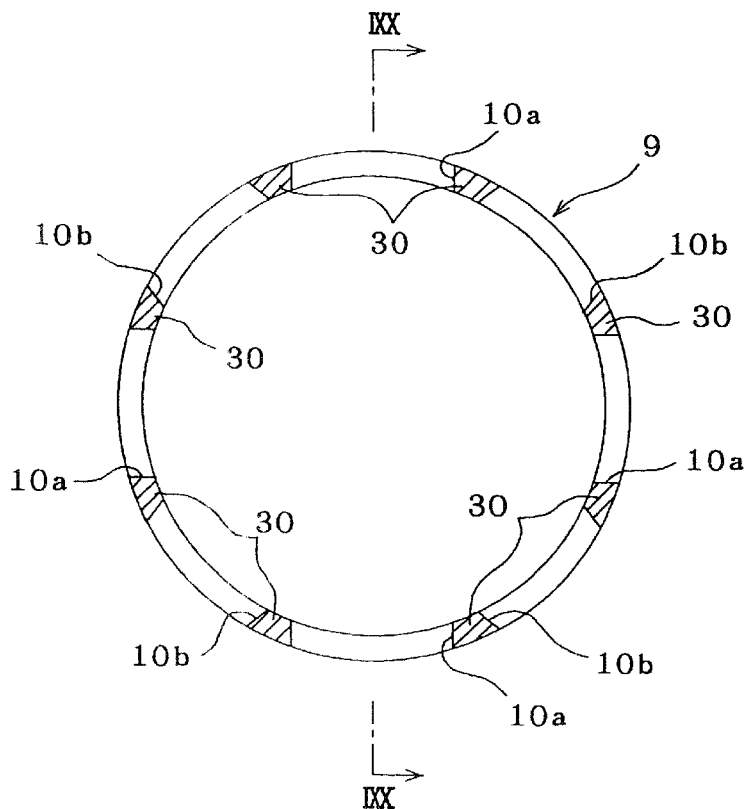
FIG. 18 is a cross sectional view of a cage to be installed in the constant velocity joint.
Figure 19:
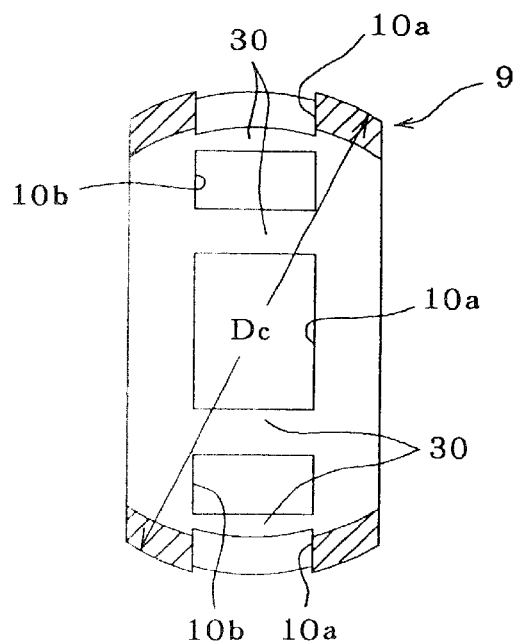
FIG. 19 is a view taken along the line IXX—IXX of FIG. 18.

In the embodiment shown in the figures, by forming the first inner-ring raceway 18 directly around the outer peripheral surface of the hub unit 16, as described above, the diameter of this first inner-ring raceway 18 is made smaller than the diameter of the second inner-ring raceway 20 which is formed around the outer peripheral surface of the inner ring 72, Moreover, since the diameter of this first inner-ring raceway 18 is smaller than the diameter of the second inner-ring raceway 20, the diameter of the outer-ring raceway 13a on the axially outside (left side in FIG. 17) which faces the first inner-ring raceway 18 is smaller than the diameter of the outer-ring raceway 13b on the axially inside (right side in FIG. 17). Furthermore, the outer radius of the axially outside half of the outer ring 11 where the outside outer-ring raceway 13a is formed is smaller than the outer radius of the axially inside half of the outer ring 11 where the inside outer-ring raceway 13b is formed. Moreover, in the embodiment shown in the figures, together with making the diameters of the first inner-ring raceway 18 and axially outside outer-ring raceway 13a smaller, the number of rolling members 21 located between this first inner-ring raceway 18 and axially outside outer-ring raceway 13a is less than the number of rolling members 21 located between the second inner-ring raceway 20 and the axially inside outer-ring raceway 13b.

Also, there is a second installation flange 17 that is formed around the outer peripheral surface on the outer end of the hub unit 16 for attaching the road wheel to the hub unit 16 such that it is made in one piece with the hub unit 16, and the base end of several studs 34 for connecting the road wheel are attached to this second installation flange 17. In the embodiment shown in the figures, the pitch circle diameter of these studs is made smaller by just the amount the outer diameter of the axially outside half of the outer ring 11 is made smaller than the outside diameter of the axially inside half (so that the heads 35 of the studs 34 do not interfere with the outer peripheral surface on the outer end of the outer ring 11). On the outer peripheral surface of the hub unit 16, the diameter of the area further inward in the axial direction than the area where the first inner-ring raceway 18 is formed is made smaller than the diameter of the inscribed circle made by the rolling members 21 with respect to the first inner-ring raceway 18. The reason for this is so that when assembling the rolling-bearing unit for the wheel, the rolling members 21 can be placed on the inside of the outer-ring raceway 13a on the inner peripheral surface on the outer end of the outer ring 11, as well as the hub unit 16 can be freely inserted on the inside of the outer ring 11 with the seal rings 28a fitted inside the inner peripheral surface on the axially outer end of the outer ring 11. Moreover, all the way around the outer peripheral surface in the middle portion of the hub unit 16, in the area between the first inner-ring raceway 18 and the part around which the inner ring 72 is fitted, there is a groove-shaped removed section 37 which makes it possible lighten the weight of the hub unit 16.

In order to prevent the inner ring 72 that fits around the hub unit 16 from shifting and moving inward in the axial direction, so that the value of preload applied to the rolling members 21 that are rotatably located between the outer-ring raceways 13a, 13b and the first and second inner-ring raceways 18, 20 is maintained at a proper value, a stop ring 39 is fitted into an anchoring groove 38 formed around the outer peripheral surface on the inner end side of the unit 16. This stop ring 39 is made of a pair of semi-arc shaped ring elements. This kind of stop ring 39 applies the proper preload to the rolling members 21, by pressing the inner ring 72 outward in the axial direction toward the hub unit 16 to fit its inner edge in the anchoring groove 38. Even when the force, which presses the inner ring 72 axially outward in the axial direction is removed, the proper preload must continue to be applied to the rolling members 21 and therefore a stop ring 39 with adequate thickness is selected to be used. In other words, several kinds of stop rings 39 are prepared having slightly differing thicknesses, and a stop ring 39 whose thickness is suitable to the relationship between the width of the anchoring groove 38 and the dimensions of the members of the rolling-bearing unit is selected and fitted in the anchoring groove 38. Therefore, when this stop ring 39 is fitted in the anchoring groove 38, it prevents the inner ring 72 from shifting and moving inward in the axial direction even if the force pressing it is removed, and it is capable of maintaining the proper preload applied to the rolling members 21.

To prevent this pair of retaining-ring element which make up the stop ring 39 from moving outward in the radial direction, and to prevent the stop ring 39 from accidentally falling out of the anchoring groove 38, part of a spacer 40 is placed around the stop ring 39. This spacer 40 is located on the inner end portion of the hub unit 16 and used for fitting around the axially outer end of the boot 42 which prevents rain water, dust or other matter from getting into the constant velocity joint 1 of this invention. Moreover, there is a seal ring 28a located between the inner peripheral surface on the outer end of the outer ring 11 and the outer peripheral surface in the middle portion of the hub unit 16, and a seal ring 28b located between the inner peripheral surface on the axially inner end of the outer ring 11 and the outer peripheral surface on the inner end of the inner ring 72, so that they cover the openings on both ends of the space 44 where the rolling members 21 are located.

Furthermore, on the axially inner end of the hub unit 16, the area onto which the inner ring 72 and the anally outer end of boot 42 are fitted functions as the outer ring 3 of the constant velocity joint 1. The eight outer engagement grooves 8 arcshaped in cross section on the inner peripheral surface of this outer ring 3 are formed so that they are orthogonal to the axial direction (left and right in FIG. 17). Also, on the radially inside of this outer ring 3 is an inner ring 2 which forms together wit the outer ring 3 the constant velocity joint 1 of the Rzeppa type. Moreover, eight inner engagement grooves 7 are formed on the outer peripheral surface of this inner ring 2 such that they are orthogonal to the circumferential direction. There is one ball 4 placed between each of these inner engagement grooves 7 and outer engagement grooves 8, for a total of eight balls 4, and they are held in pockets 10a, 10b which are formed in a retainer 9. Furthermore, a spline hole 147 is formed in the center of the inner ring 2 such that it runs in the axial direction. When attached to the automobile, the end of the drive shaft (not shown in the figures) is attached with a spline in this spline hole 147, and the hub unit 16 is able to rotate freely by way of the inner ring 2 and eight balls 4.

Two kinds of pockets 10a, 10b with differing lengths are formed in the retainer 9 in the same way as in the prior construction shown in FIGS. 1 thru 5 so that they alternate in the circumferential direction. In other words, the pockets 10a which are long in the circumferential direction are placed at every 90 degrees, and in the middle between pairs of long pockets 10a in the circumferential direction, are pockets 10b which are short in the circumferential direction. However, the embodiment shown in the figures differs from the prior construction in that the pitch of arrangement in the circumferential direction of the pockets 10a, 10b is not constant. This is described below together with the lengths in the circumferential direction of the pockets 10a, 10b. The lengths in the circumferential direction of these pockets 10a, 10b are expressed in terms of the arc length around the edge of the opening on the outer peripheral surface of the retainer 9.

Figure 20:
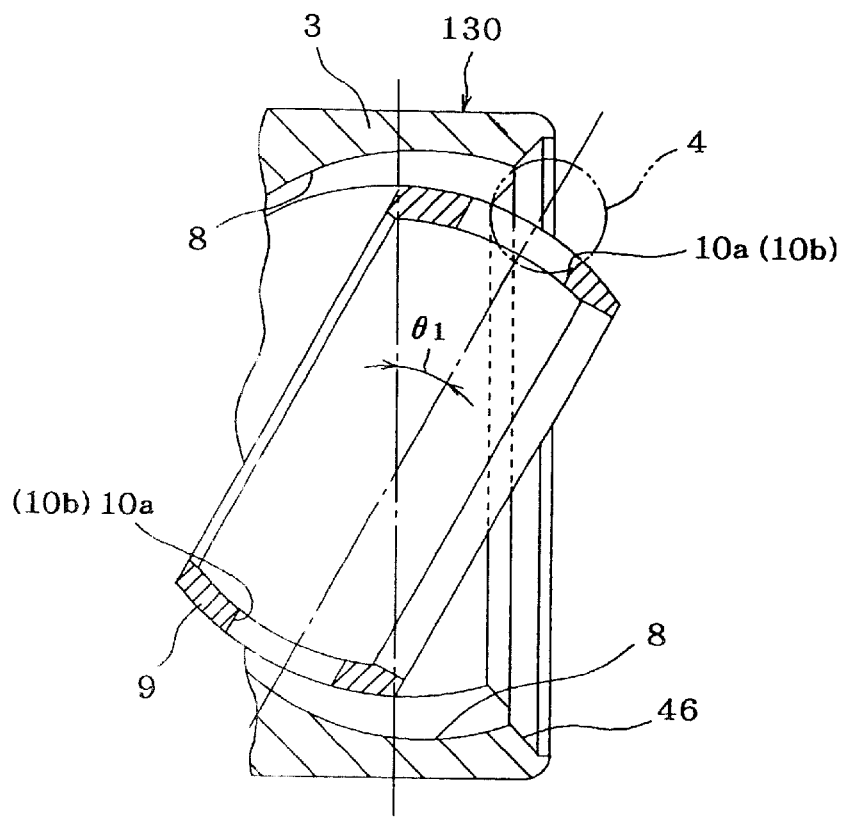
FIG. 20 is a cross sectional view to show a cage of the constant velocity joint which is titled with reference to the outer ring so as to allow the ball to be installed.
Figure 21:
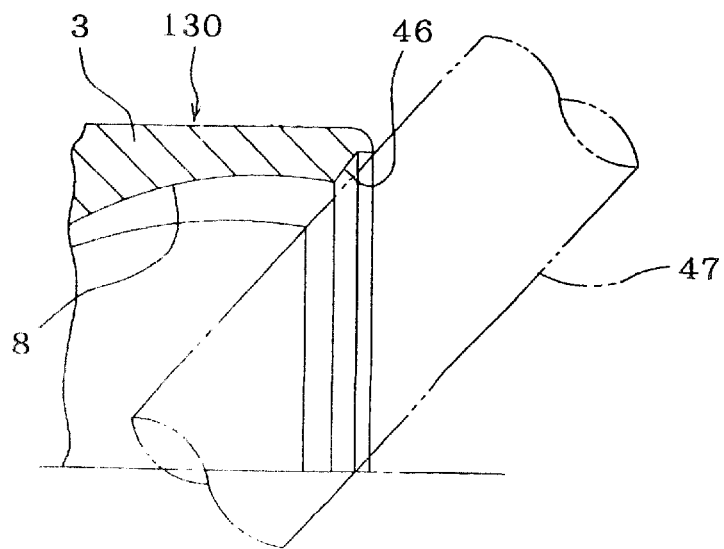
FIG. 21 is a cross sectional view to show a relation of the outer ring and the shaft of an installation tool in the state of FIG. 20.

First, if the center axis X of inner ring 2 (see FIG. 2) and the center axis Y of outer ring 3 (see FIG. 2) are greatly displaced in order to place the balls 4 in the pockets 10a, 10b, the balls 4 that have already been placed in the other pockets 10a, 10b, are at the maximum angle $\gamma_0$ (rad) that they can move in the circumferential direction. This maximum angle $\gamma_0$ can be easily calculated from an equation to be given later, or by actual measurement. In the embodiment shown in the figures, a concave section 46 is formed around the edge on the opening of the outer ring 3. When placing the balls 4 inside the pockets 10a, 10b, this concave section 46, as shown in FIG. 20, prevents interference between the balls 4 and the edge around the opening of the outer ring 3. Moreover, in the embodiment shown in the figures, the balls 4 can be placed inside the pockets 10a, 10b even if the displacement of center axes X, Y is relatively small.

Therefore, the maximum angle $\gamma_0$ is also smaller than in the prior construction.

The concave section 46 prevents the shaft 47 of the ball installation jig (see FIG. 21) from coming in contact when the edge around the opening of the outer engagement grooves 8, and contributes to smooth installation of the balls. In other words, when placing the balls 4 inside the pockets 10a, 10b, the shaft 47 of the ball installation jig is inserted into the spline hole 147 in the inner ring 2, and rockingly moves the inner ring 2. When doing this, the outer peripheral surface of the shaft 47 comes in contact with the edge around the opening of the outer grooves 8 formed with recess-land section around its circumference, which would give a strange feel to the operator operating the shaft 47. However, in this embodiment of the invention, by forming the concave section 46, it is possible to prevent the edge around the opening from coming in contact with the outer peripheral surface of the shaft 47. In other words, when the shaft 47 is greatly tilted with respect to the outer ring 41, the outer peripheral surface of this shaft 47 comes in contact with the edge around the opening of this concave section 46. The edge around this opening is smooth all the way around, therefor it does not give a strange feel to the operator operating the shaft 47, and contributes to smooth work.

If the center axis X of the inner ring 2 and the center axis Y of the outer ring 41 are maximally displaced during operation after the constant velocity joint 1 has been completely installed, then the balls 4 inside the pockets 10a, 10b move to a maximum angle $\gamma_1$ (rad) in the circumferential direction. This maximum angle $\gamma_1$ can also be easily calculated from an equation to be given later, or from actual measurement. Furthermore, the outer diameter of the retainer 9 is Dc (see FIG. 19).

In the case of the constant velocity joint of this invention, with the conditions described above, if the difference between arc lengths, or lengths in the circumferential direction, on the outer peripheral surface of the retainer 9 of the two kinds of pockets 10a, 10b, is taken to be $\Delta L$, then the size of the retainer 9 and pockets 10a, 10b are regulated to satisfy the equation, $(\gamma_0-\gamma_1)\cdot Dc/2 \leq \Delta L \leq (\gamma_0-\gamma_1)\cdot Dc$. By satisfying these conditions for the constant velocity joint of this invention, it is possible to place the balls 4 inside the pockets 10a, 10b, while at the same time increase the length in the circumferential direction of the column section between pair of adjacent pockets 10a, 10b in the circumferential direction This will be further explained below.

Figure 10:
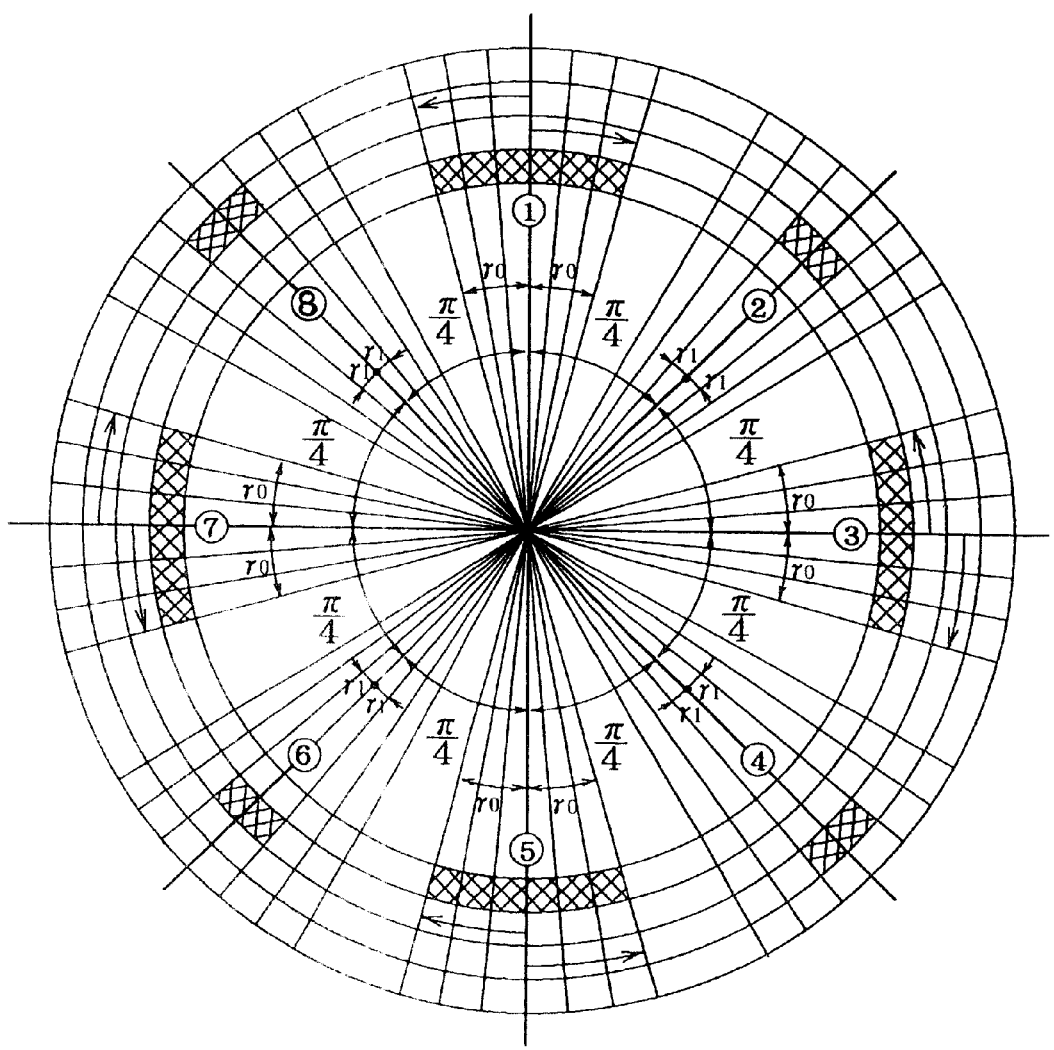
FIG. 10 is a diagrammatical view of a cage installed in the another conventional structure.
Figure 22:
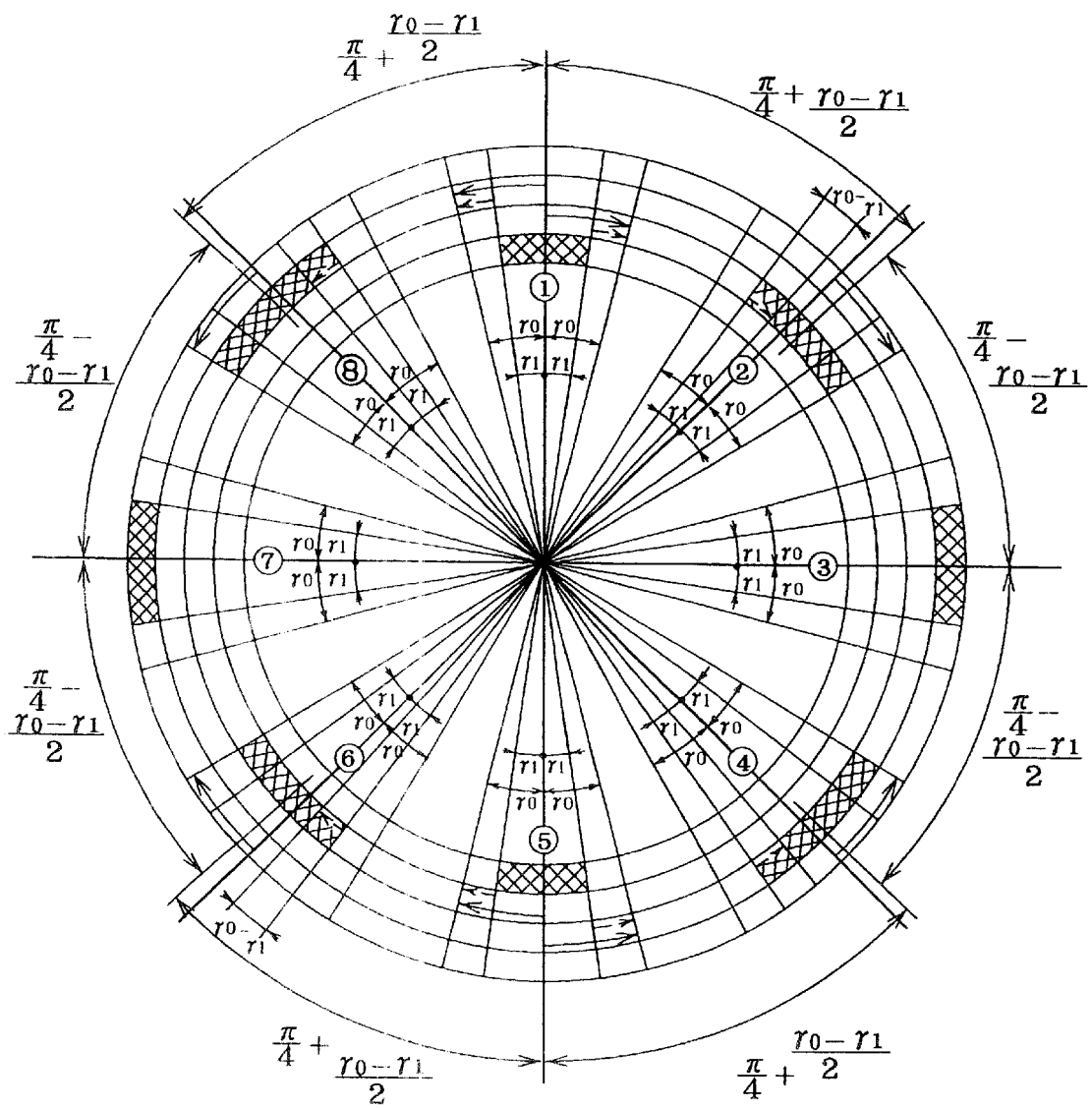
FIG. 22 is a diagrammatical view of a cage installed in an embodiment of the constant velocity joint according to the present invention.
Figure 23:
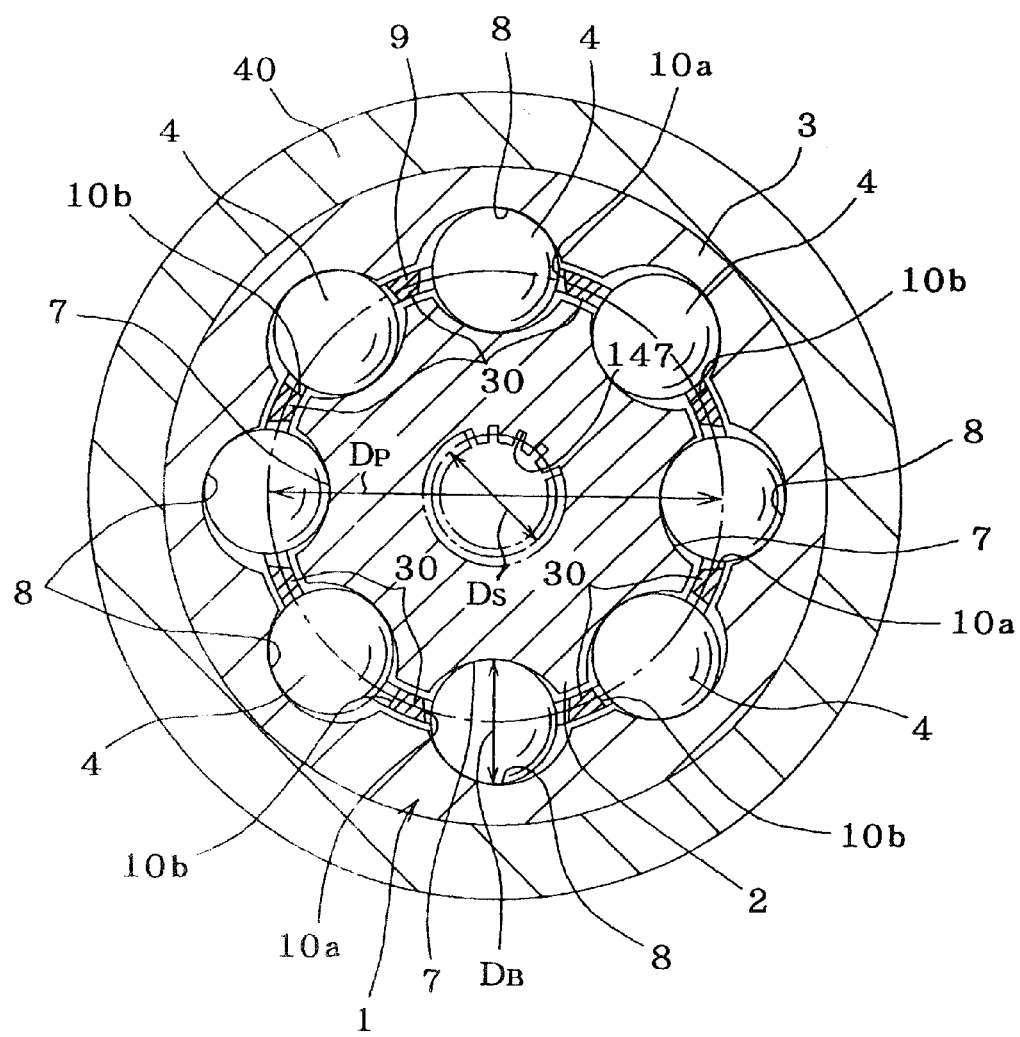
FIG. 23 is a view taken along the line XXIII—XXIII of FIG. 17.
Figure 24:
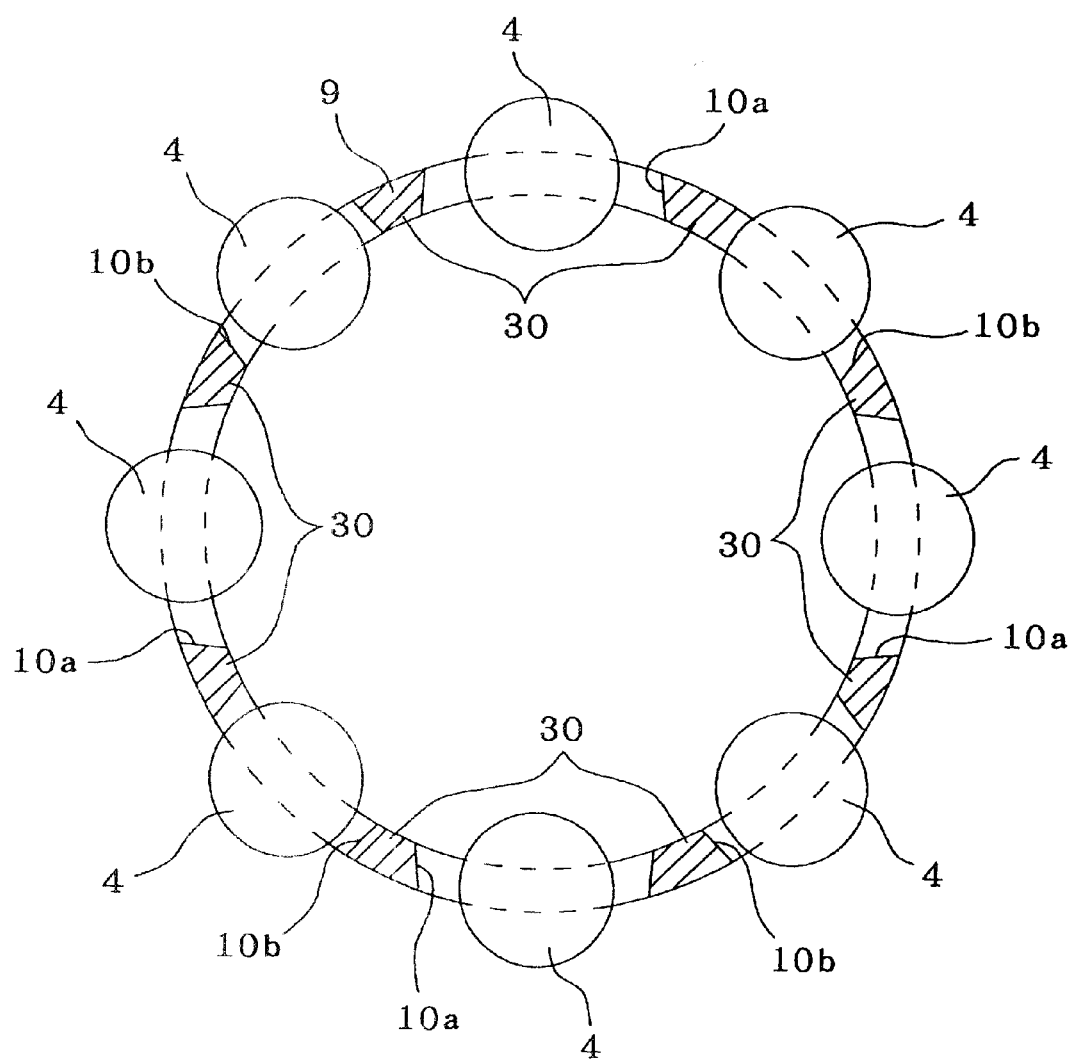
FIG. 24 is a view of the cage and balls taken in the same direction to FIG. 23.

First, FIG. 22 will be used to explain the state when the balls 4 are placed inside the pockets 10a, 10b. FIG. 22 diagrammaticaly shows the location of the pockets 10a, 10b in the retainer 9 and their respective lengths in the circumferential direction. The parts indicated in this figure are the same as that of FIG. 10. The solid arrows in FIG. 22 show the direction that balls 4 that have already been placed in the pockets 10a, 10b move in the circumferential direction with respect to the retainer 9b when the center axis of the inner ring 2 and the center axis of the outer ring 3 are greatly displaced to place balls 4 in some of the pockets 10a, 10b (in the step to sequentially install the balls 4 from the radially inside to the radially outside in a concentric manner and in the step to install the balls into the pockets 10a, 10b on the arc portions concentric with the arrows in FIG. 22). Also, the dashed arrows show the direction that the retainer 9 is rotated in when the balls 4 that have already been placed in other pockets 10a, 10b press against the edges in the circumferential direction of the pockets 10a, 10b when the center axis of the inner ring 2 and the enter axis of the outer ring 41 are greatly displaced in order to place balls 4 in some of the pockets 10a, 10b. Moreover, the length of the arrows indicates the respective amount of displacement. However, in FIG. 22, the amount of space occupied by the balls 4 with respect to the length in the circumferential direction of the pockets 10a, 10b is considered to not exist in the same way as in FIG. 10 described above, and indicate the length that the balls 4 can be displaced As shown in FIG. 22, in the case of his invention, the pitch angles in the circumferential direction of the pockets 10a, 10b are not constant. In other words, there are places where the pitch angle is $[\pi/4 \text{ radian}+(\gamma_0-\gamma_1)/2]$ and there are places where the pitch angle is $[\pi/4 \text{ radian}-(\gamma_0-\gamma_1)/2]$ and two of each pitch angle makes one set, with the sets of pitch angles that are $[\pi/4 \text{ radian}+(\gamma_0-\gamma_1)/2]$ and those that are $[\pi/4 \text{ radian}-(\gamma_0-\gamma_1)/2]$ alternating in the circumferential direction. Also, the pockets located in the centers of the sets of two pitch angles that are indicated as ①, ③, ⑤ and ⑦ are the pockets 10b, whose lengths are short in the circumferential direction, and the pockets located in the centers of the sets of two pitch angles that are indicated as ②, ④, ⑥ and ⑧ are the pockets 10a, whose lengths are long in the circumferential direction.

In order to place the balls 4 inside the pockets 10a, 10b, formed in the retainer 9 of the constant velocity joint 1 of this invention, first, of the four pockets 10b whose lengths are short in the circumferential direction, balls 4 are placed one at a time in order as shown in FIG. 22 in the pockets 10b which are indicated as ① and ⑤ in FIG. 22. And then, balls 4 are placed one at a time in order as shown in FIG. 22 in the pocket 10a, indicated as ② and ⑥ in FIG. 22, whose length are long in the circumferential direction Upon doing this, as the center axis of inner ring 2 and the center axis of outer ring 3 are greatly displaced in the direction of bending, the balls 4, which have already been placed in the pockets 10b indicated as ① and ⑤, move in the circumferential direction toward the pockets 10a indicated as ② and ⑥. During this displacement, the rolling surface of the balls 4 comes in contact with the inside surface on the end in the circumferential direction of the pockets 10b indicated as ① and ⑤. After these surfaces have come in contact, if the center axis of inner ring 2 and the center axis of outer ring 3 are further displaced in the bending direction, the balls 4 press against the retainer 9 in the circumferential direction, and this retainer 9b rotates only $(\gamma_0-\gamma_1)$ in the circumferential direction, as shown by the dashed arrows which correspond to the pockets 10a indicated as ② and ⑥ in FIG. 22 (above the shaded area for areas ② and ⑥ in FIG. 22). For simplification, the set amount of extra space $\Delta\gamma$ due to production tolerances, is not considered.) Since the lengths of the pockets 10 indicated as ② and ⑥ in FIG. 22 are long in the circumferential direction, even if the retainer 9 rotates like this in the circumferential direction, these pockets 10a and the inner and outer engagement grooves 7, 8 (see FIG. 17) match just enough to install the balls 4. Therefore, it is possible to place the balls 4 inside the pockets 10a indicated as ② and ⑥ in FIG. 22.

Next, balls 4 are placed in order one at a time, as shown in FIG. 22, in the remaining pockets 10a which are indicated as ④ and ⑧ in FIG. 22. When doing this, as the center axis of inner ring 2 and the center axis of outer ring 3 are greatly displaced in the bending direction, the balls 4 that have already been placed in the pockets 10b indicated as ① and ⑤ move in the circumferential direction in the direction of the pockets 10a indicated as ④ and ⑧. Also, when they are moving, these balls 4 come in contact with the inside surface at the end in the circumferential direction of the pockets 10b indicated as ① and ⑤. After these surfaces come in contact, if the center axis of inner ring 2 and the center axis of outer ring 3 are bent even further, the balls press the retainer 9 in the circumferential direction to cause the retainer 9 to rotate in the circumferential direction with respect to the pockets 10a indicated as ④ and ⑧ in FIG. 22 as shown by the dashed arrows. At this moment, the balls 4 installed in the pocket 10a, indicated as ② and ⑥ never move to and from the pocket 10a indicated as ④ and ⑧. Moreover, retainer 9 moves in the circumferential direction relative to the balls 4 that have already been placed in pockets 10a indicated as ② and ⑥. However, since the pockets 10a indicated as ② and ⑥ are long in the circumferential direction, the balls 4 that are placed in these pockets 10a indicated as ② and ⑥ do not come in contact with the inside surface at the end in the circumferential direction of these pockets 10a. Also, due to the balls placed inside the pockets 10b indicated as ① and ⑤, the retainer 9 rotates in the counterclockwise direction of FIG. 22 just the amount $(\gamma_0-\gamma_1)$. Even when the retainer 9 rotates in the circumferential direction like this, these pockets 10a line up with the inner and outer engagement grooves 7, 8 just enough for the balls 4 to be installed. Therefore, it is possible to place the balls 4 in the pockets 10a indicated as ④ and ⑧.

Finally, balls 4 are placed in order one at a time, as shown in FIG. 22, inside the remaining pockets 10b indicated as ③ and ⑦ in FIG. 22. When doing this, as the center axis of the inner ring 2 and the center axis of the outer ring 3 are greatly displaced in the beading direction, the balls 4 that have already been placed in the pockets 10a indicated as ②, ④, ⑥ and ⑧ move in the circumferential direction toward the pockets 10b indicated as ③ and ⑦. However, since these pockets 10a indicated as ②, ④, ⑥ and ⑧ are long in the circumferential direction, the balls 4 inside these pockets 10a indicated as ②, ④, ⑥ and ⑧ do not come in contact with the inside surface of the end in the circumferential direction of these pockets 10a. Moreover, the balls 4 that have already been placed in the pockets 10b indicated as ① and ⑤ move very little if any in the circumferential direction because the both of these pockets 10b are orthogonal to the bending direction of both of the aforementioned center axes. Therefore, by sufficiently bending the center axis of inner ring 2 and the center axis of outer ring 3, the balls 4 can be placed inside the pockets 10b indicated as ③ and ⑦. In the assembly of this embodiment, when placing the first ball 4 in the pocket 10a indicated as ① (or ⑤), it is also possible to place a ball 4 at the same time in the adjacent pocket 10b in the circumferential direction. After the first two balls 4 have been put in place, the position in the circumferential direction of the retainer 9 is regulated with respect to inner ring 2 and outer ring 3, and therefore it is not necessary to be concerned about positioning the retainer 9 in the circumferential direction when installing the remaining balls 4.

Next, the reasons why it is possible for the constant velocity joint of this invention, with balls 4 placed in the pockets 10a, 10b of the retainer 9 as described above, to maintain the strength of the retainer 9. In the prior construction as shown in FIGS. 6 thru 10, when placing the balls 4 in some of the pockets 10a, 10b, if the balls 4 which have already been placed in other pockets 10a, 10b are not allowed to press against the inside surface at the end in the circumferential direction of the pockets 10a (or 10b) to move (rotate) the retainer 9 in the circumferential direction, then the desired length in the circumferential direction of the pockets 10a, 10b is considered as follows. Incidentally, as can be clearly seen from the explanation above, desired length in the circumferential direction of the retainer pockets of the constant velocity joint of the Rzeppa type is the sum of the outer diameter of the ball held in the pockets and the amount of displacement of that ball in the circumferential direction. The outer diameter of the balls is constant for all of the balls, so it will be omitted in the following explanation, and for convenience sake, the amount that the balls held inside the pockets is allowed to move in the circumferential direction is taken to be the length of the pocket in the circumferential direction.

First, in the case of the prior construction shown in FIGS. 6 thru 10, minimum value of the length of the pockets 10a, which are long in the circumferential direction, is $[\gamma_0 \cdot Dc + D_B]$. Also, the minimum value of the length of the pockets 10b, which are short in the circumferential direction, is $[\gamma_1 \cdot Dc + D_B]$. Therefore, the difference, $\Delta L$, between the lengths in the circumferential direction of the two kinds of pockets 10a, 10b is $(\gamma_0 \cdot Dc + D_B) - (\gamma_1 \cdot Dc + D_B) = (\gamma_0 - \gamma_1)Dc$.

On the other hand, in this invention, when placing some of the balls 4 in the pockets 10a, 10b, if the balls 4, that have already been placed in other pockets 10a, 10b, press against the inside surface at the end in the circumferential direction of the pocket 10a (10b) to move (rotate) the retainer 9 in the circumferential direction, the length of the pockets 10a, which are long in the circumferential direction, becomes $(\gamma_0+\gamma_1)Dc/2 + D_B$. Also, the length of the pockets 10b, which are short in the circumferential direction, becomes $\gamma_1 Dc + D_B$. Therefore, the difference, $\Delta L$, between the lengths in the circumferential direction of these two kinds of pockets 10a, 10b becomes $[(\gamma_0+\gamma_1)Dc/2 + D_B] - (\gamma_1 \cdot Dc + D_B) = (\gamma_0-\gamma_1)Dc/2$. The length of the short pockets 10b is the same for both the prior construction and this invention, therefore the length of the column section 30 can be increased by the amount that the difference, $\Delta L$, is decreased $(\gamma_0-\gamma_1)Dc/2$. In other words, overall, the amount that the length of the column sections 30 can be increased is by the amount of $2(\gamma_0-\gamma_1)Dc$.

In other words, the angle of displacement of the balls 4 inside the pockets 10b, which are short in the circumferential direction, is determined by the maximum joint angle when using the constant velocity joint, and is $(2\gamma_0)$ for both the prior construction and this invention. Therefore, increasing the length in the circumferential direction of the column sections 30, which exist between pairs of adjacent pockets 10a, 10b in the circumferential direction, depends on how much tile length of the pockets 10a, 10b, which are long in the circumferential direction, can be made smaller. In the case of the prior construction, since rotation of the retainer 9 when placing the balls 4 inside the pockets 10a, 10b was not considered, the length of the long pockets 10a could not be decreased very much. On the other hand, in the case of this invention, since rotation of the retainer 9 is used, it is possible to decrease the length of the long pockets 10a. Particularly, by rotating the retainer 9 to its maximum limit when installing the balls 4, it is possible to decrease the length of the pockets 10a to a minimum length, and to increase the length of the column section 30 to a maximum. The difference in arc length between the length of the long pockets 10a and the length of the short pockets 10b when the length of the column sections is increased to a maximum becomes $(\gamma_0-\gamma_1)Dc/2$.

However, in the actuality, when taking the ease of installing the balls 4, variations in dimensions of the components, and pitch tolerance when placing the balls 4 inside the pockets 10a, 10b, the angle of displacement of the balls held in the long pockets 10a is kept a little more than $(\gamma_0+\gamma_1)$. Moreover, in order to increase the length of the column section 30 it is best to keep the angle of displacement of the balls 4 held in the long pockets 10a to $(\gamma_0+\gamma_1)$. The tolerance due to variations should be kept as small as possible.

The maximum value of the angle of displacement of the balls 4 in the long pockets 10a is ($2\gamma_0$) if the retainer is not rotated when placing the balls 4 in the pockets 10a, 10b. Under the conditions of this invention, the angle of displacement of the balls held in the long pockets 10a was greater than ($\gamma_0+\gamma_1$) and less than ($2\gamma_0$) If the angles $\gamma_0$ and $\gamma_1$ can be calculated from the following equations $$\gamma_0 = B_A \tan^{-1}(\tan B_A \cdot \cos \theta_0)$$

$B_A$=360 degrees/Number of balls 4 (eight)=45 degrees ($\pi/4$ radian)

$\theta_0$: Angle of inclination of the retainers 9 when installing the balls 4 (½ of the joint angle)

$\gamma_1 = B_n \tan^{-1}(\tan B_n \cdot \cos \theta_1)$ $\theta_1$: Angle of inclination of the retainers 9 when the magnum joint angle in use is applied (½ of joint angle)

$B_n$=46.2 deg. (If the joint angle, $2 \cdot \theta_1$, is 46 degrees, then the angle of inclination, $\theta_1$, of the retainers 9 is 23 degrees. Then $B_n$ is 46.2 degrees.)

In the rolling-bearing unit for wheels with a constant velocity joint, constructed as described in the embodiment above, supporting the road wheel so that it rotates freely with respect to the suspension, is the same as for the rolling-bearing unit for wheels with the prior constant velocity joint. Moreover, in the case of the rolling-bearing unit for wheels with the constant velocity joint of this invention the number of inner and outer engagement grooves 7, 8 of the constant velocity joint 1 is eight, and the number of balls 4 used is eight, therefore, as torque is transmitted between the hub 16 and the inner ring 2 when using the rolling-bearing unit for wheels, it is possible to make the size of the load applied to each of the balls 4 of the constant velocity joint 1 less than that of the prior construction shown in FIGS. 2 and 3. Therefore, it is possible to decrease the outer diameter of the balls 4 by that amount, as well as decrease the diameter of the circumscribed circle of the balls 4 which are arranged in a circular pattern, and the diameter of the circumscribed circle of the outer engagement grooves 8. Therefore, by the amount that the diameter of the circumscribed circle of the outer engagement grooves 8 is decreased, it is possible to reduce the outer diameter dimensions of the rolling-bearing unit for wheels and make it more compact and light weight.

In the structure of this example, the number of balls is increased from six to eight, while the outer diameter of balls is decreased, thereby effectively decreasing the outer diameter dimensions of the rolling bearing unit.

Particularly, in the case of the rolling-bearing unit with constant velocity joint of this invention, it is possible to place the balls 4 in the pockets 10a, 10b of the retainer 9, and maintain the dimensions of the column section 30 between pairs of adjacent pockets 10a, 10b in the circumferential direction, thus improving the durability of the retainer 9. As a result, it is possible to make the constant velocity joint 1 more compact, which contributes to making it possible to integrate the outer ring 3 of the constant velocity joint 1 and the hub unit 16 of the rolling-bearing unit for wheels in creating a fourth-generation hub unit.

Particularly, as illustrated, by disposing the outer half of the outer engagement grooves 8 on the radially inside of the second inner ring raceway 20, not only the outer diameter dimensions but also the axial dimensions of the rolling bearing unit can be reduced, so that the whole apparatus is effectively made compact and light weighted, In the construction of this example, the inner ring raceway 20 of the rolling bearing unit must be made larger than the outer engagement grooves 8, so the outer diameter dimensions of the rolling beating unit are enlarged.

In the structure of this example, the number of balls is increased from six to eight, while the outer diameter of balls is decreased, thereby effectively decreasing the outer diameter dimensions of the rolling bearing unit.

Furthermore, in the embodiment shown in the figures and as described above, by reducing the diameter of the pitch circle of the outer rolling members 21, it is possible to reduce the outer diameter of the axially outer half of the outer ring 11. Also, by the amount that the outer diameter of the axially outer half of the outer ring 11 is decreased, it is possible to reduce the diameter of the pitch circle of the studs 34 which are fixed to the second installation flange 17 on the outer peripheral surface of the hub unit 16. Therefore, with the dimensions in the axial direction of the hub unit 16 not increased, it is possible to decrease the outer diameter of the second installation flange 17 to which the studs 34 are attached, and make it possible to make the rolling-bearing unit for wheels even more compact and light weight.

As the diameter of the pitch circle of the rolling members 21 of the outside row is made smaller then the diameter of the pitch circle of the rolling members 21 of the inside row, the basic rated load of the outer row of rolling members becomes less than the basic rated load of the inner row of rolling members. Therefore, if the load on both rows is the same, then the life of the outer rolling members becomes shorter than the life of the inner rolling members. On the other hand, for a normal automobile, the load applied to the outer row of rolling members is less than the load applied to the inner row of rolling members. Therefore, design both rows so that their lives are about the same becomes easier and more efficient. In the embodiment shown in the figures, balls are used as the rolling members 21, however, in the case of a rolling-bearing unit for an automobile that carries heavy loads, it is also possible to use tapered rollers as the rolling members. Of course, this invention can also be applied to a rolling-bearing unit which uses tapered rollers as the rolling members.

In the constant velocity joint of the present invention, constructed and operated as mentioned above, with the number of balls for power transmission being eight, the construction can be reduced in outer diameter, and the rigidity of the cage for holding the balls can be made higher to improve the durability of the cage. Accordingly, the rolling bearing unit for wheels combined integrally with the constant velocity joint, so called the fourth generation hub unit, can be made compact and light weighted with sufficient durability maintained.

Figure 2:
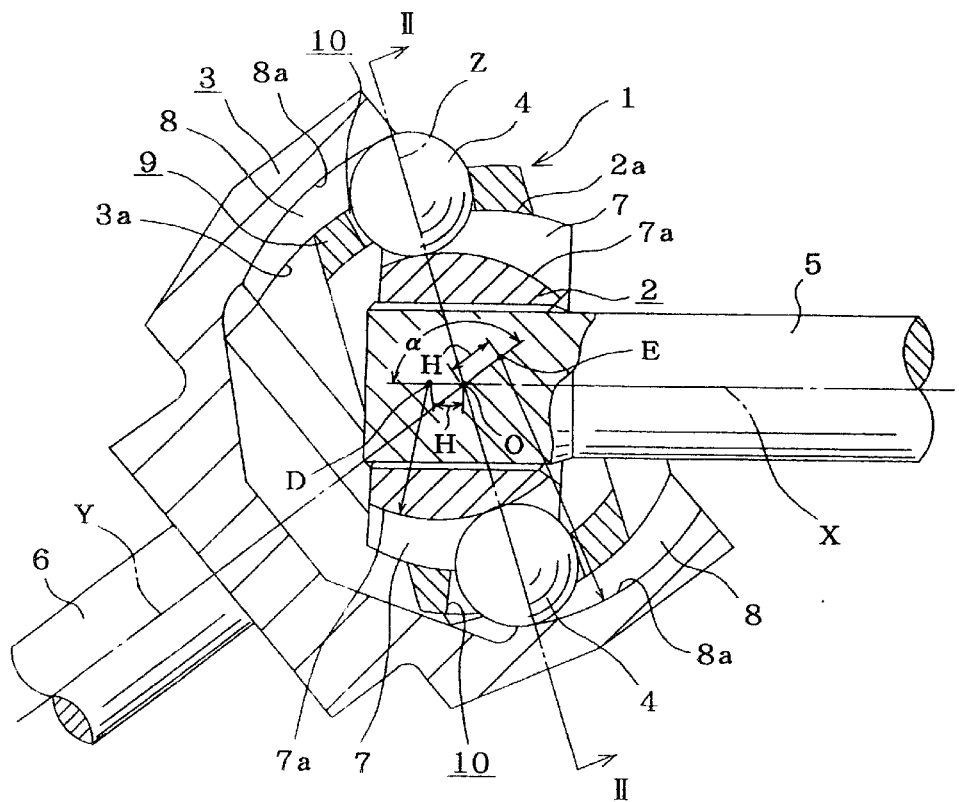
FIG. 2 is a cross sectional view of part of a conventional constant velocity joint in FIG. 1 with a joint angle applied thereto.

In the illustrated example, in FIG. 17 a recessed portion 46 is generally circumferentially formed along the open peripheral edge portion of the outer member or ring 3. Upon installing the balls 4 inside the pockets 10, interference between the balls 4 and the open peripheral edge portion of the outer member or ring 3 as shown in FIG. 20. Accordingly, even if the displacement amount between the central axis X of the inner ring 2 and the central axis Y as shown in FIG. 2 is relatively small, the balls 4 can be installed in the pockets 10, respectively.

With the recessed portion 46, the shaft 47 (FIG. 21) of the ball installation tool is prevented from coming into contact with the open end edge portion of the outer engagement grooves 8 for smooth ball installation. Specifically, in order to install the balls 4 into the pockets 10, the shaft 47 is inserted into the spline hole 51 of the inner member or ring 2 for rocking displacement of the inner ring 2.

Here, when the outer peripheral surface of the shaft 47 comes into contact with the open end edge portion of the outer engagement grooves 8 defining recesses and lands in a circumferential direction, the operator handling the shaft 47 would feel strange.

On the contrary, in the present example, where the recessed portion 46 is formed, the open end edge portion is prevented from coming into contact with the outer peripheral surface of the shaft 47. Specifically, when the shaft 47 is largely inclined with reference to the outer member or ring 3, the outer peripheral surface of the shaft 47 is engaged with the open peripheral edge portion of the recessed portion 46. Since the open peripheral edge portion smoothly extends generally along the circumference, the operator handling the shaft 47 never feels strange, and the operation can be smoothly carried out.

With the constant velocity joint 1 as constructed above, the relations between the pitch circle diameter $D_P$ of the eight balls 4, the diameter $D_B$ of the balls 4, and the pitch circle diameter $D_S$ of the female serration on the inner peripheral surface of the spline 147 hole are controlled as in $3.5 \leq D_P/D_B \leq 3.9$, $2.0 \leq D_P/D_S \leq 2.2$, and $0.51 \leq D_B/D_S \leq 0.63$.

In operation, the rolling bearing unit with the constant velocity joint 1 as constructed above in the present example can support rotatably a vehicle wheel with reference to the suspension as in the rolling bearing unit with the conventional constant velocity joint installed therein.

In the constant velocity joint 1 of the present example, even when the number of balls 4 is increased from six, generally conventionally used, to eight with die ball diameter reduced in order to make it compact, the strength and durability of cage 9, inner ring 2 and outer ring 3 could be kept the same to those of the conventional one with six balls. Thus, a compact constant velocity joint 1 is achieved without compromising the strength and durability in elements and the so-called fourth generation hub unit comprising the hub 16 of the rolling bearing unit for wheels integrally combined with the constant velocity joint 1 can be made practical.

Figure 3:
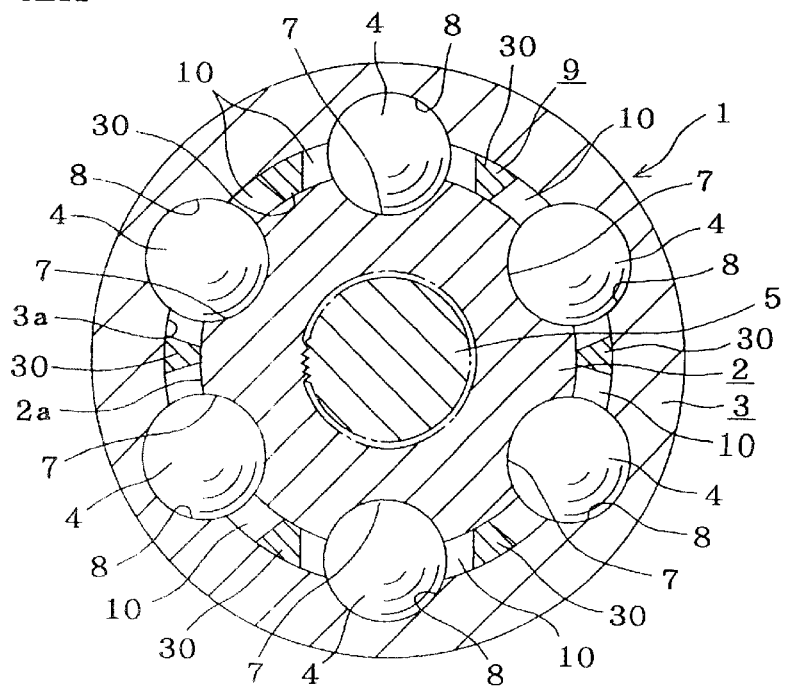
FIG. 3 is a view taken along the line III—III of FIG. 2 where no joint angle is applied.
Figure 4:
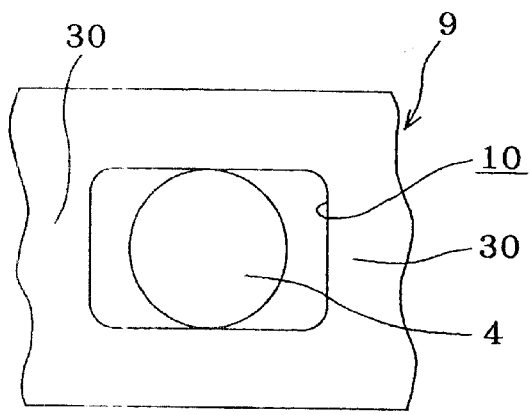
FIG. 4 is a view of part of a cage taken from the outer periphery side.
Figure 5:
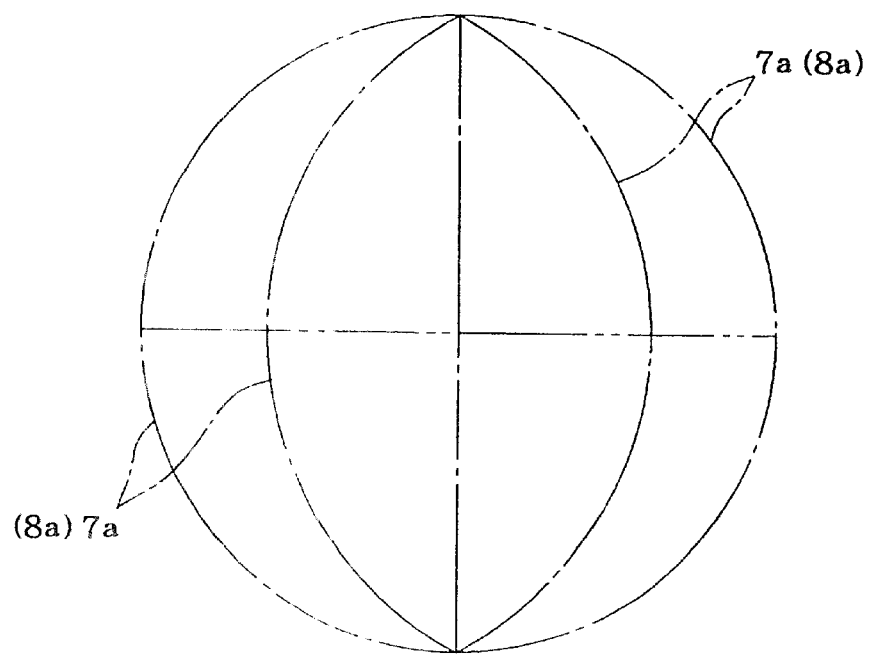
FIG. 5 is a diagrammatical view of the bottom surfaces of the inner and outer engagement grooves to show their position relation.

In the case of the rolling bearing unit for wheels having the constant velocity joint 1 of the present embodiment, the number of the inner and outer engagement grooves 7, 8, and balls is eight, and therefore upon torque transmission between the hub 16 and the inner member or ring 2 during use of the bearing unit, the load applied to the balls 4, respectively, of the constant velocity joint 1 can be made lower than in the conventional structure as shown in FIGS. 2 and 3. Accordingly, by that amount, the outer diameter of the balls 4, and the diameter of the circumscribing circle of the balls 4 assembly arranged, and the diameter of the circumscribing circle of the outer engagement grooves 8 can all be reduced. Further, as the diameter of the circumscribing circle of the outer engagement grooves 8 is reduced, the outer diameter of the rolling bearing unit for wheels can be reduced to make the whole apparatus compact and light-weight, keeping the strength and durability in constituent elements.

Particularly, as in the illustrated examples, as the member 3 on which the outer engagement grooves 8 are formed is disposed inside the member 72 on which the second inner ring raceway 20 is formed, not only the outer diameter but also the axial size of the rolling bearing unit for wheels can be made small to efficiently make the whole apparatus compact and light-weight. In such a structure of the present embodiment, the second inner ring raceway 20 of the main body of the rolling bearing unit must be made larger than the outer engagement grooves 8, so that the outer diameter of the main body of the rolling bearing unit is enlarged. Therefore, the number of balls 4 is increased from six to eight with the outer diameter of the rolling bearing unit can be made smaller, which is an outstanding effect of the present invention.

In addition, in the illustrated example, as mentioned above, the pitch circle diameter of the rolling members 21 on the axially outer row is made smaller to reduce the outer diameter of the outer half portion of the outer member or ring 3. And by that amount, the pitch circle diameter of the studs 34 fixed to the second mount flange 17 on the outer peripheral surface of the hub 16 can be made small. Accordingly, without enlarging the anal size of the hub 16, the outer diameter of the second mount flange 17 for fixedly supporting the studs 35 can be made smaller to efficiently make the rolling bearing unit compact and light-weighted.

Since the constant velocity joint of the present embodiment is constructed and operated as mentioned above, the outer diameter is made smaller with the number of the balls being eight for rotational power transmission while the strength and durability in constituent elements are secured. Accordingly, the rolling bearing unit for wheels having the constant velocity joint integrally combined with it, so-called fourth generation hub unit, can be made compact and light-weighted with keeping sufficient durability.

What is claimed is:

1. A constant velocity joint comprising an inner member having a spline hole and eight inner engagement grooves, an outer member having eight outer engagement grooves, a cage and eight engagement balls provided in the cage between the inner engagement grooves and the outer engagement grooves, wherein the pitch circle diameter $(D_P)$ of the engagement balls, the engagement ball diameter $(D_B)$ and the pitch circle diameter $(D_S)$ of the spline hole of the inner member are defined in the relations of $3.5 \leq (D_P)/(D_B) \leq 3.9$, $2.0 \leq (D_P)/(D_S) \leq 2.2$ and $0.51 \leq (D_P)/(D_S) \leq 0.63$.

* * * * *